(12) United States Patent
Saul et al.

(10) Patent No.: US 10,955,977 B2
(45) Date of Patent: Mar. 23, 2021

(54) EXTENDER OBJECT FOR MULTI-MODAL SENSING

(71) Applicant: Microsoft Technology Licensing, LLC, Redmond, WA (US)

(72) Inventors: Greg Saul, Cambridge (GB); Nicolas Villar, Cambridge (GB); Daniel Cletheroe, Stapleford (GB); Christian Holz, Seattle, WA (US); Haiyan Zhang, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/231,677

(22) Filed: Aug. 8, 2016

(65) Prior Publication Data
US 2017/0123563 A1 May 4, 2017

Related U.S. Application Data

(63) Continuation-in-part of application No. 14/931,049, filed on Nov. 3, 2015.

(51) Int. Cl.
*H01Q 1/44* (2006.01)
*H01Q 1/24* (2006.01)
(Continued)

(52) U.S. Cl.
CPC .......... *G06F 3/0445* (2019.05); *G06F 3/0446* (2019.05); *G06F 3/04166* (2019.05); *H01Q 1/241* (2013.01); *H01Q 1/44* (2013.01); *H01Q 1/48* (2013.01); *H01Q 9/0442* (2013.01); *H04B 5/0031* (2013.01); *G06F 2203/04104* (2013.01);
(Continued)

(58) Field of Classification Search
CPC .................. G06F 3/0416; G06F 3/044; G06F 2203/04104; G06F 2203/04106; G06F 3/04166; G06F 3/0446; G06F 3/0445; H01Q 1/52; H01Q 1/2258; H01Q 1/44;
(Continued)

(56) References Cited

U.S. PATENT DOCUMENTS 2,170,373 A 8/1939 Kind
3,524,188 A * 8/1970 Bowman .................. H01Q 3/26
343/754

(Continued)

FOREIGN PATENT DOCUMENTS

CN 101131432 A 2/2008
CN 101421692 A 4/2009
(Continued)

OTHER PUBLICATIONS

"International Search Report and Written Opinion Issued in PCT Application No. PCT/US2016/059808", dated May 8, 2017, 18 Pages.
(Continued)

*Primary Examiner* — Patrick N Edouard
*Assistant Examiner* — Joseph P Fox

(57) ABSTRACT

An extender object for use with a multi-modal sensing surface comprises at least two antenna coils. A first antenna coil in the object is electrically connected to a second antenna coil in the object and the two antenna coils may be spatially separated. At least one of the first and second antenna coils comprises a plurality of radial elements extending in and/or out from the coil.

20 Claims, 14 Drawing Sheets

(51) Int. Cl.
*G06F 3/044* (2006.01)
*G06F 3/041* (2006.01)
*H01Q 1/48* (2006.01)
*H01Q 9/04* (2006.01)
*H04B 5/00* (2006.01)
*H01Q 7/00* (2006.01)

(52) U.S. Cl.
CPC ..... *G06F 2203/04106* (2013.01); *H01Q 7/00* (2013.01)

(58) Field of Classification Search
CPC ........ H01Q 1/241; H01Q 1/48; H01Q 9/0442; H01Q 7/00; G06K 7/10376; H04B 5/0031
See application file for complete search history.

(56) References Cited

U.S. PATENT DOCUMENTS

| | | | |
|---|---|---|---|
| 5,214,427 A | 5/1993 | Yano | |
| 5,355,105 A | 10/1994 | Angelucci, Sr. | |
| 5,521,601 A | 5/1996 | Kandlur et al. | |
| 5,623,129 A | 4/1997 | Mallicoat | |
| 6,062,937 A | 5/2000 | Kikuchi | |
| 6,118,379 A | 9/2000 | Kodukula et al. | |
| 6,204,764 B1 | 3/2001 | Maloney | |
| 6,366,260 B1 | 4/2002 | Carrender | |
| 6,404,643 B1 * | 6/2002 | Chung | B32B 3/08 361/737 |
| 6,407,665 B2 | 6/2002 | Maloney | |
| 6,443,796 B1 | 9/2002 | Shackelford | |
| 6,454,624 B1 | 9/2002 | Duff et al. | |
| 6,585,165 B1 | 7/2003 | Kuroda et al. | |
| 6,668,447 B2 | 12/2003 | Samant et al. | |
| 6,750,769 B1 | 6/2004 | Smith | |
| 6,773,322 B2 | 8/2004 | Gabai et al. | |
| 6,834,251 B1 | 12/2004 | Fletcher | |
| 6,903,056 B2 | 6/2005 | Nagano et al. | |
| 6,903,656 B1 | 6/2005 | Lee | |
| 7,058,434 B2 | 6/2006 | Wang et al. | |
| 7,232,069 B1 * | 6/2007 | White | G06K 7/10326 235/380 |
| 7,310,045 B2 | 12/2007 | Inui | |
| 7,372,967 B2 | 5/2008 | Henson et al. | |
| 7,413,124 B2 | 8/2008 | Frank et al. | |
| 7,432,855 B2 | 10/2008 | Mohamadi | |
| 7,439,972 B2 | 10/2008 | Timcenko | |
| 7,488,231 B2 | 2/2009 | Weston | |
| 7,639,237 B2 | 12/2009 | Perkins | |
| 7,821,274 B2 | 10/2010 | Philipp et al. | |
| 7,859,408 B2 | 12/2010 | Tuttle | |
| 7,977,577 B2 | 7/2011 | Lee | |
| 8,079,890 B2 | 12/2011 | Seligman | |
| 8,257,157 B2 | 9/2012 | Polchin | |
| 8,292,733 B2 | 10/2012 | Crawford et al. | |
| 8,463,332 B2 | 6/2013 | Sato et al. | |
| 8,523,185 B1 | 9/2013 | Gilbreath et al. | |
| 8,550,916 B2 | 10/2013 | Raynal | |
| 8,579,196 B1 | 11/2013 | Lowe | |
| 8,670,711 B2 | 3/2014 | Fine et al. | |
| 8,743,086 B2 | 6/2014 | Chen et al. | |
| 8,749,390 B2 | 6/2014 | Eray | |
| 8,803,661 B2 | 8/2014 | Kaaja et al. | |
| 8,970,537 B1 | 3/2015 | Shepelev et al. | |
| 8,982,094 B2 | 3/2015 | Pi et al. | |
| 9,004,976 B2 | 4/2015 | Rosenberg | |
| 9,007,306 B2 | 4/2015 | Liu | |
| 9,011,327 B2 | 4/2015 | Schenk | |
| 9,022,575 B2 | 5/2015 | Hsu | |
| 9,028,312 B1 | 5/2015 | Wei et al. | |
| 9,088,862 B2 | 7/2015 | Jalkanen et al. | |
| 9,111,164 B1 | 8/2015 | Anderton et al. | |
| 9,152,832 B2 | 10/2015 | Royston et al. | |
| 9,168,464 B2 | 10/2015 | Karunaratne | |
| 9,229,563 B2 | 1/2016 | Park | |
| 9,269,588 B2 | 2/2016 | Xu et al. | |
| 9,270,337 B2 | 2/2016 | Zhu et al. | |
| 9,270,344 B2 | 2/2016 | Rosenberg | |
| 9,274,562 B2 | 3/2016 | Franklin et al. | |
| 9,627,753 B2 | 4/2017 | Caimi et al. | |
| 9,914,066 B2 | 3/2018 | Cletheroe et al. | |
| 9,933,891 B2 | 4/2018 | Saul et al. | |
| 10,133,889 B2 | 11/2018 | Daniel et al. | |
| 2002/0106995 A1 | 8/2002 | Callaway, Jr. | |
| 2002/0185981 A1 | 12/2002 | Dietz et al. | |
| 2002/0196250 A1 | 12/2002 | Anderson et al. | |
| 2003/0148700 A1 | 8/2003 | Arlinsky et al. | |
| 2003/0178291 A1 | 9/2003 | Schilling | |
| 2004/0124248 A1 | 7/2004 | Selker | |
| 2005/0134506 A1 | 6/2005 | Egbert | |
| 2005/0183264 A1 | 8/2005 | Eckstein et al. | |
| 2005/0225451 A1 | 10/2005 | Inui | |
| 2005/0242950 A1 | 11/2005 | Lindsay et al. | |
| 2005/0242959 A1 * | 11/2005 | Watanabe | G06K 19/07749 340/572.7 |
| 2006/0035611 A1 | 2/2006 | Connell et al. | |
| 2006/0045310 A1 | 3/2006 | Tu et al. | |
| 2007/0062852 A1 | 3/2007 | Zachut et al. | |
| 2007/0222700 A1 | 9/2007 | De et al. | |
| 2008/0184281 A1 | 7/2008 | Ashizaki et al. | |
| 2008/0186138 A1 | 8/2008 | Butler et al. | |
| 2008/0186174 A1 | 8/2008 | Alexis et al. | |
| 2008/0238685 A1 | 10/2008 | Tuttle | |
| 2008/0238885 A1 | 10/2008 | Zachut et al. | |
| 2008/0246614 A1 | 10/2008 | Paananen | |
| 2009/0027210 A1 | 1/2009 | Sakama et al. | |
| 2009/0029771 A1 | 1/2009 | Donahue | |
| 2009/0167699 A1 | 7/2009 | Rosenblatt et al. | |
| 2010/0001923 A1 | 1/2010 | Zilber | |
| 2010/0053111 A1 | 3/2010 | Karlsson | |
| 2010/0267421 A1 * | 10/2010 | Rofougaran | G06F 3/044 455/566 |
| 2011/0227871 A1 | 9/2011 | Cannon | |
| 2011/0263297 A1 | 10/2011 | Kaaja et al. | |
| 2011/0273382 A1 | 11/2011 | Yoo et al. | |
| 2012/0062490 A1 | 3/2012 | Heatherly et al. | |
| 2012/0075199 A1 | 3/2012 | Hsieh | |
| 2012/0146770 A1 | 6/2012 | Brannen et al. | |
| 2012/0162032 A1 | 6/2012 | Yang et al. | |
| 2012/0258436 A1 | 10/2012 | Lee | |
| 2013/0044078 A1 | 2/2013 | Hallenberg et al. | |
| 2013/0078914 A1 | 3/2013 | Royston et al. | |
| 2013/0155005 A1 | 6/2013 | Liang | |
| 2013/0176175 A1 | 7/2013 | Zusman et al. | |
| 2013/0181937 A1 * | 7/2013 | Chen | G06F 3/044 345/174 |
| 2013/0194071 A1 | 8/2013 | Sloegedal et al. | |
| 2013/0194230 A1 * | 8/2013 | Kawaguchi | G06F 3/044 345/174 |
| 2013/0196596 A1 | 8/2013 | Parekh et al. | |
| 2013/0207938 A1 | 8/2013 | Ryshtun et al. | |
| 2013/0217295 A1 | 8/2013 | Karunaratne | |
| 2013/0231046 A1 | 9/2013 | Pope et al. | |
| 2013/0234734 A1 | 9/2013 | Iida et al. | |
| 2013/0256175 A1 | 10/2013 | Wilkinson | |
| 2013/0278540 A1 | 10/2013 | Yilmaz | |
| 2013/0285797 A1 * | 10/2013 | Paulsen | G06K 7/10128 340/10.5 |
| 2014/0029017 A1 | 1/2014 | Lee et al. | |
| 2014/0043248 A1 | 2/2014 | Yeh et al. | |
| 2014/0092054 A1 | 4/2014 | Ng | |
| 2014/0104188 A1 | 4/2014 | Bakken et al. | |
| 2014/0127995 A1 | 5/2014 | Hendricksen et al. | |
| 2014/0139347 A1 | 5/2014 | Forster | |
| 2014/0148095 A1 | 5/2014 | Smith et al. | |
| 2014/0160692 A1 | 6/2014 | Lau | |
| 2014/0176819 A1 | 6/2014 | Yilmaz | |
| 2014/0187153 A1 | 7/2014 | Zhu et al. | |
| 2014/0217176 A1 | 8/2014 | Baldischweiler et al. | |
| 2014/0240100 A1 | 8/2014 | Johns | |
| 2014/0283809 A1 | 9/2014 | Huebl | |
| 2014/0340347 A1 | 11/2014 | Tenuta | |
| 2014/0342663 A1 | 11/2014 | Eaton et al. | |
| 2014/0347244 A1 | 11/2014 | Pagani et al. | |

(56) References Cited

U.S. PATENT DOCUMENTS

| | | |
|---|---|---|
| 2015/0049063 A1 | 2/2015 | Smith et al. |
| 2015/0062045 A1 | 3/2015 | White et al. |
| 2015/0084650 A1 | 3/2015 | Zachut et al. |
| 2015/0090242 A1 | 4/2015 | Weston et al. |
| 2015/0116091 A1 | 4/2015 | Lefevre et al. |
| 2015/0138025 A1 | 5/2015 | Horikoshi et al. |
| 2015/0169011 A1 | 6/2015 | Bibl et al. |
| 2015/0169122 A1 | 6/2015 | Kulik et al. |
| 2015/0193052 A1 | 7/2015 | Fuller et al. |
| 2015/0220184 A1 | 8/2015 | Park et al. |
| 2015/0242012 A1* | 8/2015 | Petcavich ............. G06F 1/1652 345/174 |
| 2015/0258435 A1 | 9/2015 | Zhang et al. |
| 2015/0258459 A1 | 9/2015 | Scott et al. |
| 2015/0268730 A1 | 9/2015 | Walline et al. |
| 2015/0277617 A1 | 10/2015 | Gwin et al. |
| 2015/0290536 A1 | 10/2015 | Schumacher |
| 2016/0043752 A1* | 2/2016 | Slater .................. H04B 1/3838 375/297 |
| 2016/0087693 A1 | 3/2016 | Shimomura et al. |
| 2016/0101370 A1 | 4/2016 | Madsen et al. |
| 2016/0124574 A1 | 5/2016 | Rouaissia et al. |
| 2016/0190851 A1 | 6/2016 | Pudipeddi et al. |
| 2017/0074966 A1* | 3/2017 | Pirc ........................ G01S 5/0294 |
| 2017/0123531 A1 | 5/2017 | Saul et al. |
| 2017/0123554 A1 | 5/2017 | Villar et al. |
| 2017/0123561 A1 | 5/2017 | Saul et al. |
| 2017/0123562 A1 | 5/2017 | Cletheroe et al. |
| 2017/0124364 A1 | 5/2017 | Villar et al. |
| 2017/0132438 A1 | 5/2017 | Cletheroe et al. |
| 2017/0252664 A1 | 9/2017 | Cletheroe et al. |

FOREIGN PATENT DOCUMENTS

| | | |
|---|---|---|
| CN | 101443087 A | 5/2009 |
| CN | 101601196 A | 12/2009 |
| CN | 101911378 A | 12/2010 |
| CN | 101950231 A | 1/2011 |
| CN | 202094276 U | 12/2011 |
| CN | 102394340 A | 3/2012 |
| CN | 102426492 A | 4/2012 |
| CN | 102799907 A | 11/2012 |
| CN | 202600754 U | 12/2012 |
| CN | 102906760 A | 1/2013 |
| CN | 202736099 U | 2/2013 |
| CN | 202795320 U | 3/2013 |
| CN | 103069647 A | 4/2013 |
| CN | 103294301 A | 9/2013 |
| CN | 103383453 A | 11/2013 |
| CN | 103425373 A | 12/2013 |
| CN | 103534674 A | 1/2014 |
| CN | 103761000 A | 4/2014 |
| CN | 104318279 A | 1/2015 |
| CN | 104391603 A | 3/2015 |
| CN | 104428781 A | 3/2015 |
| CN | 104992595 A | 10/2015 |
| EP | 1271415 A1 | 1/2003 |
| EP | 2172834 A2 | 4/2010 |
| EP | 2535797 A2 | 12/2012 |
| EP | 2620845 A1 | 7/2013 |
| EP | 2620845 A9 | 5/2014 |
| EP | 2741183 A1 | 6/2014 |
| EP | 2208390 B1 | 2/2015 |
| EP | 2837651 A1 | 2/2015 |
| KR | 100816616 B1 | 3/2008 |
| WO | 02095674 A1 | 11/2002 |
| WO | 2007094993 A1 | 8/2007 |
| WO | 2008147820 A1 | 12/2008 |
| WO | 2009142383 A1 | 11/2009 |
| WO | 2010150232 A1 | 12/2010 |
| WO | 2014067547 A1 | 5/2014 |
| WO | 2015080696 A | 6/2015 |
| WO | 2015115527 A | 8/2015 |
| WO | 2015131746 A2 | 9/2015 |
| WO | 2016055290 A2 | 4/2016 |

OTHER PUBLICATIONS

"AppMates", Retrieved from https://web.archive.org/web/20160701062447/http://www.appmatestoys.com/, Retrieved on: Jul. 13, 2016, 1 Page.

"Fisher Price", Retrieved from https://web.archive.org/web/20160712103809/http://service.mattel.com/instruction_sheets/Y3610a-0920.pdf, Retrieved on Jul. 12, 2016, 20 Pages.

"Imaginext® Apptivity™ Fortress", Retrieved from https://web.archive.org/web/20160326105733/http://www.fisher-price.com/shop/imaginext-apptivity-fortress-y3610, Retrieved on: Jul. 12, 2016, 8 Pages.

"Laser Tag", Retrieved from https://en.wikipedia.org/wiki/Laser_tag, Retrieved on: Jul. 12, 2016, 10 Pages.

"Lego Shop", Retrieved from http://shop.lego.com/en-US/LEGO-Fusion-Battle-Towers-21205, Retrieved on: Dec. 4, 2015, 2 Pages.

"Modular Robotics", Retrieved from https://www.modrobotics.com/cubelets/, Retrieved on: Dec. 4, 2015, 17 Pages.

"Multilayer Circuits", Retrieved from <<http://web.archive.org/web/20170425033503/https://www.minco.com/components/Home/Flex-Circuits/Product-Technologies/Multilayer>>, Retrieved on: Jul. 13, 2016,1 Page.

"NFC EZ430 Reader Module Reference Design", Retrieved from http://www.ti.com/tool/TIDM-NFC-EZ430-MODULE, Sep. 24, 2014, 3 Pages.

"Project Jacquard", Retrived from <<https://atap.google.com/jacquard/>>, Jul. 13, 2016, 13 Pages.

"Roll-Up Piano", Retrieved from <<http://www.specialneedstoys.com/uk/communication/musical-instruments/roll-up-piano-musical-instrument-toy.html?utm_campaign=gshopping&utm_source=web&utm_medium=ppc&gclid=COOI9dintc0CFdUW0wodt6YL0g>>, Retrieved on: Jul. 13, 2016,6 Pages.

"Super Scope", Retrieved from https://en.wikipedia.org/wiki/Super_Scope, Retrieved on: Jul. 12, 2016, 3 Pages.

"Advisory Action Issued in U.S. Appl. No. 14/931,049", dated Mar. 20, 2018, 7 Pages.

Watanabe, et al., "The Soul of ActiveCube—Implementing a Flexible, Multimodal, Three-Dimensional Spatial Tangible Interface", In Magazine-Computers in Entertainment, vol. 2, Issue 4, Oct. 1, 2004, pp. 173-180.

"Final Office Action Issued in U.S. Appl. No. 14/931,049", dated Oct. 4, 2017, 25 Pages.

"Non Final Office Action Issued in U.S. Appl. No. 14/931,049", dated Jun. 11, 2018, 27 Pages.

"Non Final Office Action Issued in U.S. Appl. No. 14/931,049", dated Apr. 7, 2017, 19 Pages.

"Non Final Office Action Issued in U.S. Appl. No. 15/063,258", dated Mar. 1, 2017, 9 Pages.

"Non Final Office Action Issued in U.S. Appl. No. 15/231,174", dated May 9, 2017, 22 Pages.

"Non Final Office Action Issued in U.S. Appl. No. 15/231,352", dated Feb. 23, 2018, 6 Pages.

"Non Final Office Action Issued in U.S. Appl. No. 15/231,655", dated Mar. 12, 2018, 16 Pages.

"Non Final Office Action Issued in U.S. Appl. No. 15/231,757", dated Jun. 25, 2018, 21 Pages.

"Non Final Office Action Issued in U.S. Appl. No. 15/231,760", dated Mar. 8, 2018, 24 Pages.

Blass, Evan, "Samsung will Reportedly Launch Devices with Foldable and Rollable Screens in 2017", Retrieved from <<https://venturebeat.com/2016/06/07/samsung-will-reportedly-launch-devices-with-foldable-and-rollable-screens-in-2017/>>, Jun. 7, 2016, 7 Pages.

Chan, et al., "CapStones and ZebraWidgets: Sensing Stacks of Building. Blocks, Dials and Sliders on Capacitive Touch Screens", In Proceedings of the SIGCHI Conference on Human Factors in Computing Systems, May 5, 2012, pp. 2189-2192.

(56) References Cited

OTHER PUBLICATIONS

Epawn, "The Next Generation Gaming Experience, Motion Capture for 'Toys to Life' Games", Retrieved from http://epawn.fr/, Retrieved on: Oct. 10, 2016, 10 Pages.

Goh, et al., "The i-Cube: Design Considerations for Block-based Digital Manipulatives and Their Applications", In Proceedings of Designing Interactive Systems Conference, Jun. 11, 2012, 10 Pages.

Hardy, et al., "Touch & Interact: Touch-based Interaction of Mobile Phones with Displays", In Proceedings of 10th International Conference on Human Computer Interaction with Mobile Devices and Services, Sep. 2, 2008, pp. 245-254.

Ho, et al., "Coupled Data Communication Techniques for High-Performance and Low-Power Computing", In Book—Springer Science & Business Media, Jun. 3, 2010, pp. 51-77.

Holz, et al., "Biometric Touch Sensing: Seamlessly Augmenting Each Touch with Continuous Authentication", In Proceedings of the 28th Annual ACM Symposium on User Interface Software and Technology, Nov. 5, 2015, pp. 303-312.

Jennings, et al., "CONSTRUCT/VizM: A Framework for Rendering Tangible Constructions", In SIGRADI Conference, Nov. 17, 2010, pp. 415-418.

Kim, et al., "A Highly Sensitive Capacitive Touch Sensor Integrated on a Thin-Film-Encapsulated Active-Matrix OLEO or Ultrathin Displays", In Proceedings of IEEE Transactions on Electron Devices, vol. 58, Issue 10, Oct. 2011, pp. 3609-3615.

Kitamura, et al., "Real-time 3D Interaction with ActiveCube", In Proceedings of Extended Abstracts on Human Factors in Computing Systems, Mar. 31, 2001, pp. 355-356.

Kramer, Kwindla Hultman, "Moveable Objects, Mobile Cod", In Doctoral Dissertation, Massachusetts Institute of Technology, Aug. 7, 1998, 29 Pages.

Kranz, et al., "A Display Cube as a Tangible User Interface", In Proceedings of the Seventh International Conference on Ubiquitous Computing, Sep. 11, 2005, 2 Pages.

Kubitza, et al., "WebCiip: A Connector for Ubiquitous Physical Input and Output for Touch Screen Devices", In Proceedings of ACM International Joint Conference on Pervasive and Ubiquitous Computing, Sep. 8, 2013, 4 Pages.

Macleod, Peter, "A Review of Flexible Circuit Technology and its Applications", By Prime Faraday Technology Watch, Jun. 2002, 59 Pages.

Opam, Kwame, "LG's Rollable Display is a Cazy Prototype from a Still-Distant Future", Retrieved from <https://www.theverge.com/2016/1/5/10720838/lg-18-inch-rollable-display-prototype-hands-on-ces-2016>>, Jan. 5, 2016, 3 Pages.

"International Preliminary Report on Patentability Issued in PCT Application No. PCT/US2016/059804", dated Feb. 7, 2018, 10 Pages.

"International Search Report and Written Opinion Issued in PCT Application No. PCT/US2016/059804", dated Jan. 30, 2017, 14 Pages.

"Second Written Opinion Issued in PCT Application No. PCT/US2016/059804", dated Oct. 12, 2017, 6 Pages.

"International Search Report and Written Opinion Issued in PCT Application No. PCT/US2016/059805", dated May 9, 2017, 21 Pages.

"International Preliminary Report on Patentability Issued in PCT Application No. PCT/US2016/059806", dated Jan. 22, 2018, 10 Pages.

"International Search Report and Written Opinion Issued in PCT Application No. PCT/US2016/059806", dated Mar. 3, 2017, 14 Pages.

"Second Written Opinion Issued in PCT Application No. PCT/US2016/059806", dated Oct. 17, 2017, 8 Pages.

"International Preliminary Report on Patentability Issued in PCT Application No. PCT/US2016/059807", dated Jan. 15, 2018, 16 Pages.

"International Search Report and Written Opinion Issued in PCT Application No. PCT/US2016/059807", dated Jan. 31, 2017, 13 Pages.

"Second Written Opinion Issued in PCT Application No. PCT/US2016/059807", dated Sep. 12, 2017, 5 Pages.

"International Search Report and Written Opinion Issued in PCT Application No. PCT/US2016/059809", dated Feb. 27, 2017, 12 Pages.

"International Preliminary Report on Patentability Issued in PCT Application No. PCT/US2016/060274", dated Sep. 25, 2017, 5 Pages.

"International Search Report and Written Opinion Issued in PCT Application No. PCT/US2016/060274", dated Feb. 14, 2017, 10 Pages.

"International Search Report and Written Opinion Issued in PCT Application No. PCT/US17/019796", dated Jun. 6, 2017, 11 Pages.

Puppendahl, et al., "Capacitive Near-Field Communication for Ubiquitous Interaction and Perception", In Proceedings of the ACM International Joint Conference on Pervasive and Ubiquitous Computing, Sep. 13, 2014, pp. 231-242.

Saenz, Aaron, "Siftables are Changing the Shape of Computing", Retrieved from https://singularityhub.com/2010/05/05/siftables-are-changing-the-shape-of-computing/#sm.0001pok8sozeqfijt972n8z9t6bir, May 5, 2010, 4 Pages.

"Satzuma 26319 USB Roll Up Flexible Keyboard, PC I Mac, Keyboard", Retrieved from <<https://www.amazon.co.uk/Satzuma-26319-ROLL-Flexible-Keyboard/dp/B00446YLCE>>, Sep. 23, 2010, 5 Pages.

Schweikardt, et al., "RoBlocks: a Robotic Construction Kit for Mathematics and Science Education", In Proceedings of the 8th International Conference on Multimodal Interfaces, Nov. 2, 2006, pp. 72-75.

Vidales, Carlos E., "How to Calibrate Touch Screens", In Proceedings of the Embedded Systems Programming vol. 15, Issue 6, Jun. 2002, 12 Pages.

Vu, et al., "Distinguishing Users with Capacitive Touch Communication", In Proceedings of the 18th Annual International Conference on Mobile Computing and Networking, Aug. 22, 2012, 12 Pages.

"Final Office Action Issued in U.S. Appl. No. 15/231,760", dated Nov. 16, 2018, 20 Pages.

Bolotnyy, et al., "The Practicality of Multi-Tag RFID Systems", In Proceedings of the 1st International Workshop on RFID Technology—Concepts, Applications, Challenges, Jun. 1, 2007, 10 Pages.

Broll, et al., "Mobile and physical user interfaces for NFC-based mobile interaction with multiple tags", In Proceedings of the 12th International Conference on Human computer interaction with mobile devices and services, 10 Pages.

Hinske Steve, "Determining the Position and Orientation of Multi-Tagged Objects Using RFID Technology", Proceedings: In Proceedings of the Fifth Annual IEEE International Conference on Pervasive Computing and Communications Workshops, Mar. 19, 2007, 5 Pages.

"Office Action Issued in European Patent Application No. 16801628.5", dated Feb. 27, 2019, 11 Pages.

"Office Action Issued in European Patent Application No. 16801897.6", dated Feb. 27, 2019, 7 Pages.

"Office Action Issued in European Patent Application No. 16801898.4", dated Feb. 7, 2019, 7 Pages.

"Final Office Action Issued in U.S. Appl. No. 14/931,049", dated Jan. 2, 2019, 29 Pages.

"Non-Final Office Action Issued in U.S. Appl. No. 14/931,049", dated Apr. 30, 2019, 30 Pages.

"Non Final Office Action Issued in U.S. Appl. No. 15/231,760", dated Mar. 25, 2019, 21 Pages.

"Applicant Initiated Interview Summary Issued in U.S. Appl. No. 14/931,049", dated May 28, 2019, 4 Pages.

"Office Action Issued in European Patent Application No. 16794898.3", dated May 17, 2019, 3 Pages.

"Office Action Issued in European Patent Application No. 16795504.6", dated Aug. 7, 2019, 4 Pages.

"Second Office Action Issued in European Patent Application No. 16801628.5", dated Aug. 5, 2019, 14 Pages.

"Final Office Action Issued in U.S. Appl. No. 15/231,760", dated Sep. 18, 2019, 22 Pages.

(56) References Cited

OTHER PUBLICATIONS

"First Office Action and Search Report Issued in Chinese Patent Application No. 201780015514.6", dated Feb. 6, 2020, 9 Pages.
"Office Action Issued in Chinese Patent Application No. 201680063588.2", dated Aug. 3, 2020, 11 Pages.
"Office Action Issued in European Patent Application No. 16801629.3", dated Apr. 2, 2020, 10 Pages.
"First Office Action and Search Report Issued in Chinese Patent Application No. 201680064138.5", dated Sep. 2, 2020, 14 Pages.
"First Office Action and Search Report Issued in Chinese Patent Application No. 201680064358.8", dated Aug. 21, 2020, 10 Pages.
"First Office Action and Search Report Issued in Chinese Patent Application No. 201680064397.8", dated Aug. 20, 2020, 11 Pages.
"First Office Action and Search Report Issued in Chinese Patent Application No. 201680064403.X", dated Aug. 25, 2020, 13 Pages.
"First Office Action and Search Report Issued in Chinese Patent Application No. 201680063752.X", dated Oct. 19, 2020, 10 Pages.
"Office Action Issued in Chinese Patent Application No. 201680063588.2", dated Dec. 2, 2020, 7 Pages.

* cited by examiner

EXTENDER OBJECT FOR MULTI-MODAL SENSING

CROSS-REFERENCE TO RELATED APPLICATION

This non-provisional utility application is a continuation-in-part of U.S. application Ser. No. 14/931,049 entitled "Multi-modal Sensing Surface" and filed on Nov. 3, 2015, which is incorporated herein in its entirety by reference.

BACKGROUND

Capacitive multi-touch surfaces can detect the positions of one or more fingers on the surface, but cannot uniquely identify objects placed on the surface. Optical multi-touch tables, which use a camera/projector system or sensor-in-pixel technology, have the ability to identify objects equipped with a visual marker as well as sense multi-touch user input. However, such tables are large, have rigid form-factor limitations (because of the optical arrangement) and a high power consumption.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An extender object for use with a multi-modal sensing surface comprises at least two antenna coils. A first antenna coil in the object is electrically connected to a second antenna coil in the object and the two antenna coils may be spatially separated. At least one of the first and second antenna coils comprises a plurality of radial elements extending in and/or out from the coil.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
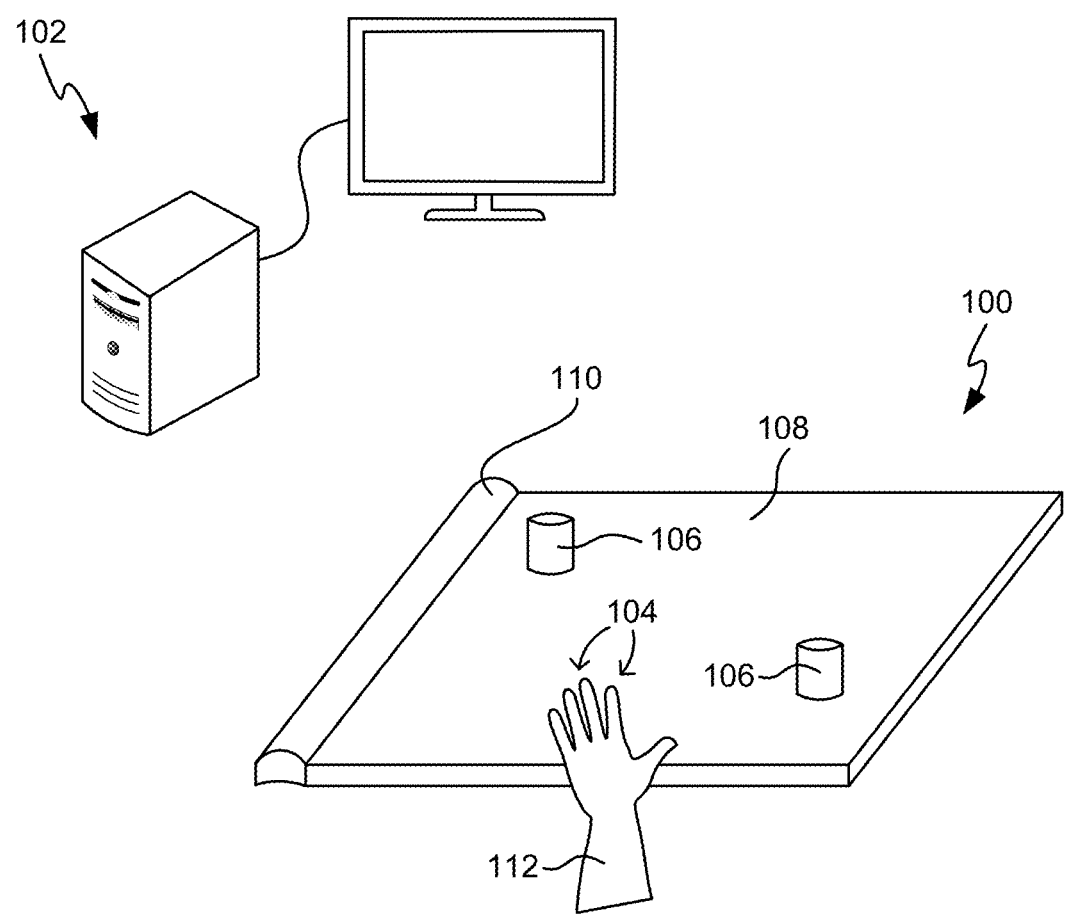
FIG. 1 is a schematic diagram showing an example multi-modal sensing surface.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, the existing surface devices which can detect multi-touch user input and also identify objects placed on the surface (by way of markers on the bottoms of the objects) use optical techniques to locate and identify objects. Consequently, the surface devices are bulky and consume a lot of power when operating. The multi-touch user input detection may also use optical techniques (e.g. using FTIR or imaging of the surface) or may use capacitive sensing (in a similar manner to conventional smartphones and tablets).

Unlike capacitive sensing surfaces, NFC and RFID readers can identify objects via parasitically powered tags which when activated transmit the identifier (ID) of the tag (which may be a unique ID); however, they do not provide information about the location of the object being identified. Furthermore, if capacitive sensing and NFC are used in close proximity to each other, they can interfere with each other.

The embodiments described below are not limited to implementations which solve any or all of the disadvantages of known sensing surfaces.

Described herein is a multi-modal sensing surface which can both detect multi-touch user input and also locate one or more objects on the surface. Where an object comprises a short-range wireless tag (e.g. an NFC or near-field RFID tag) the multi-modal sensing surface can both locate and identify the object. The sensing surface may operate as an input device for a computing device and may be a separate peripheral device or may be integrated into the computing device itself.

The multi-modal sensing surface described herein comprises a capacitive sensing electrode array and an array of RF antennas with one array being overlaid on top of the other array (e.g. the array of RF antennas may be underneath the capacitive sensing electrode array, i.e. on the opposite side of the capacitive sensing electrode array from a surface that a user touches). A first sensing module is coupled to the capacitive sensing electrode array and is configured to detect both a decrease and an increase in the capacitance between electrodes in the array. A second sensing module is coupled to the array of RF antennas and is configured to selectively tune and detune the RF antennas in the array, where, when tuned, these antennas are tuned to the same frequency as the wireless tags in the objects (e.g. 13.56 MHz for NFC) such that the second sensing module can activate a proximate wireless tag and receive data from the tag (e.g. a unique ID of the tag). The location and identity information (where known) are then provided as an input to software running on a computing device.

Described herein is also an extender object which can be used with the multi-modal sensing surface described herein or with any other multi-modal sensing surface which comprises both capacitive touch sensing and sensing of short-range wireless tags. The extender object comprises two spatially separated antenna coils which are electrically connected together and so can be used to extend the range of the multi-modal sensing surface to sense short-range wireless tags. The first antenna coil in the extender object couples with an antenna coil in the short-range wireless tag and the second antenna coil in the extender object couples with an RF antenna in the multi-modal sensing surface. The two antenna coils additionally extend the capacitive touch sensing of the multi-modal sensing surface and at least one of the two antenna coils comprises a plurality of radial elements which extend in or out from the coil. These radial elements (or spokes) extend the touch area which can be detected using the multi-modal sensing surface and so improve the touch detection performance.

FIG. 1 is a schematic diagram showing a multi-modal sensing surface 100 which may operate as a peripheral device (e.g. an input device) for a separate computing device 102 and may communicate with the separate computing device 102 using wired or wireless technologies (e.g. USB, Bluetooth™, Wi-Fi™, etc.). The sensing surface 100 is capable of detecting and locating both multi-touch user input (e.g. a user's fingers 104) and one or more objects 106 on the surface. If any of the objects 106 include a wireless tag, the sensing surface 100 is also capable of identifying those objects 106 by reading the wireless tag(s).

As shown in FIG. 1, the sensing surface 100 has two parts—a first part 108 (which may be referred to as the sensing mat or pad) comprising the two overlaid arrays (the capacitive sensing electrode array and the array of RF antennas) and a second part 110 comprising the active electronics (the first and second sensing modules). Depending upon the implementation of the sensing surface 100, the second part may also comprise a communication interface arranged to communicate with the separate computing device 102. In other examples, however, the sensing surface 100 may be integrated with a computing device (e.g. such that the second part 110 comprises a processor, memory, display interface, etc.).

Figure 2:
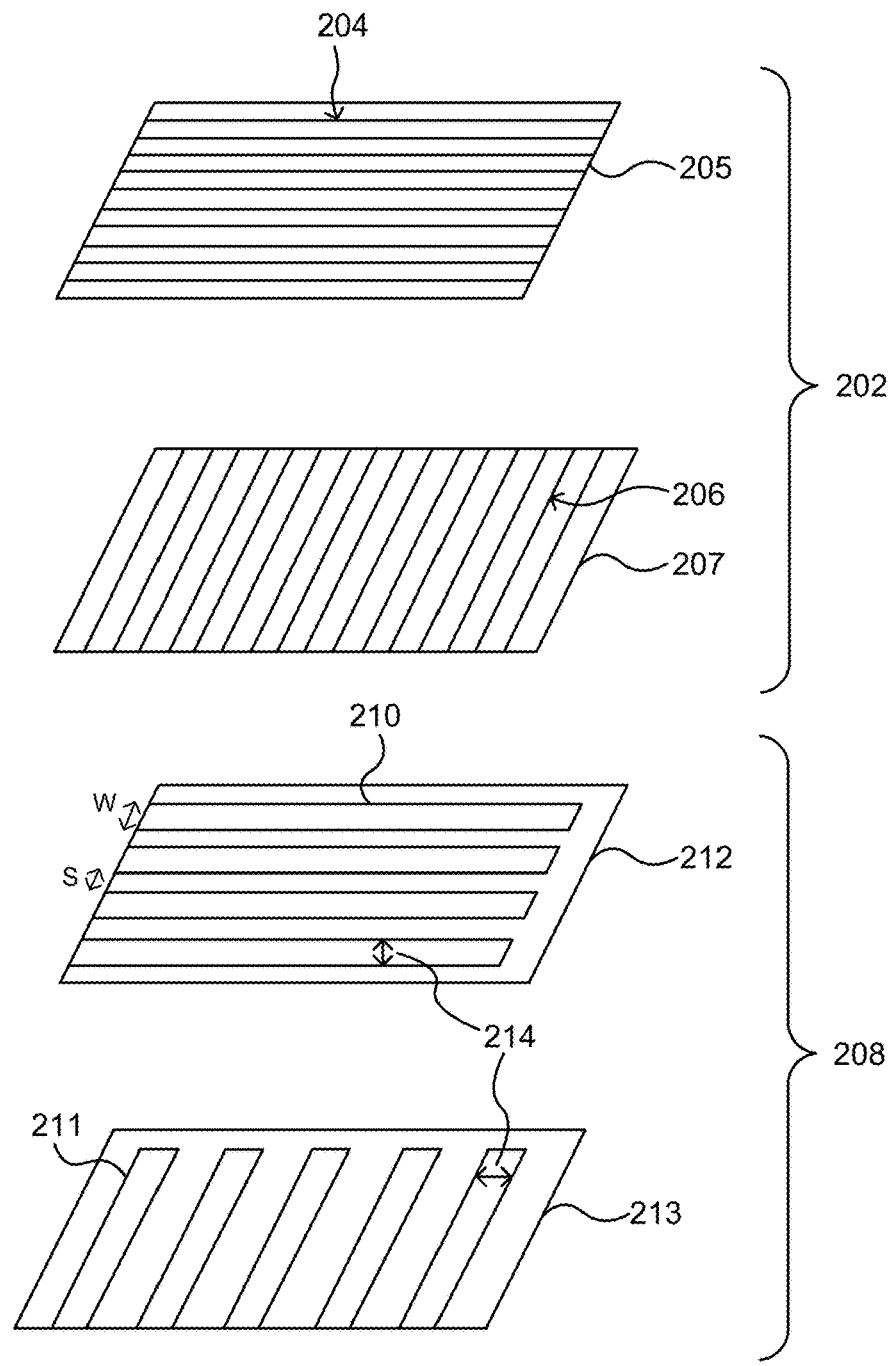
FIG. 2 is a schematic diagram showing a part of the sensing surface of FIG. 1 in more detail.

The first part 108 of the sensing surface 100 is a multi-layer structure comprising one array overlaid over the other array as shown in more detail in FIG. 2. In the example shown, the capacitive sensing electrode array 202 is above the array of RF antennas 208 (e.g. when in the orientation shown in FIG. 1 and with a user touching the uppermost, touch surface of the first part 108, as indicated by the hand 112 in FIG. 1), i.e. the capacitive sensing electrode array 202 is closer to the touch surface than the array of RF antennas 208. Having the capacitive sensing electrode array 202 closer to the touch surface than the array of RF antennas 208 enables the array of RF antennas to provide a shield beneath the capacitive sensing layer (e.g. to prevent false detection caused by objects underneath the sensing surface) and a ground touch return path for user's fingers, as described below.

In various examples the two arrays 202, 208 may be substantially the same size so that the arrays overlap completely. In other examples, however, the two arrays may not be the same size (e.g. the capacitive sensing electrode array 202 may be larger than the array of RF antennas or vice versa) and/or the arrays may be partially offset from each other so that they do not overlap completely and such that there are portions of the sensing surface which are multi-modal (i.e. where the two arrays overlap) and there are portions of the sensing surface which are not (i.e. where there is only one of the two arrays 202, 208).

The capacitive sensing electrode array 202 comprises a first set of electrodes 204 in a first layer 205 and a second set of electrodes 206 in a second layer 207. In the example shown in FIG. 2 the two sets of electrodes 204, 206 are arranged perpendicular to each other such that one set may be referred to as the x-axis electrodes and the other set may be referred to as the y-axis electrodes. In other examples, however, the sets of electrodes may be arranged such that they are not exactly perpendicular to each other but instead the electrodes cross at a different angle. The sets of electrodes 204, 206 are separated by some insulation which may be in the form of an insulating layer (not shown in FIG. 2) or insulation over the wires that form one or both of the sets of electrodes 204, 206.

The array of RF antennas 208 comprises a plurality of loop antennas and the example in FIG. 2 the array 208 comprises two sets of antennas 210, 211 in two separate layers 212, 213; however, in other examples, the array of RF antennas 208 may comprise only a single set of antennas (i.e. one of the two sets 210, 211 shown in FIG. 2 may be omitted). Two sets of antennas, as shown in FIG. 2 may be provided to enable the sensing surface 100 to distinguish between two objects at different locations but which are both proximate to the same RF antenna (such that if there was only one set of antennas, a single RF antenna would be able to read the tags in both objects). Such a row/column arrangement of RF antennas (comprising two sets of antennas 210, 211 as shown in FIG. 2) also enables the sensing surface to scale better (i.e. to larger sizes of sensing surface) and makes scanning across the area to find an object faster. In an alternative arrangement, a matrix (or grid) of individual antennas (e.g. m by n antennas arranged in a grid) may be used. Such a grid does not scale as well as the arrangement shown in FIG. 2, but may enable addressing of an object at a known location to be performed faster.

In the example shown in FIG. 2 the two sets of antennas 210, 211 are arranged perpendicular to each other in a row/column matrix such that one set may be referred to as the x-axis antennas and the other set may be referred to as the y-axis antennas. In other examples, however, the sets of antennas may be arranged such that they are not exactly perpendicular to each other but instead the antennas cross at a different angle or there may be only a single set of antennas (i.e. one of the sets 210, 211 is omitted). The two sets of antennas 210, 211 are separated by some insulation which may be in the form of an insulating layer (not shown in FIG. 2) or insulation over the wires that form one or both of the sets of antennas 210, 211.

The two arrays 202, 208 are separated by a distance (e.g. by an insulating layer also not shown in FIG. 2) in order to reduce the mutual capacitance between the capacitive sensing electrodes and the 'ground' layer provided by the NFC antennas.

Figure 3:
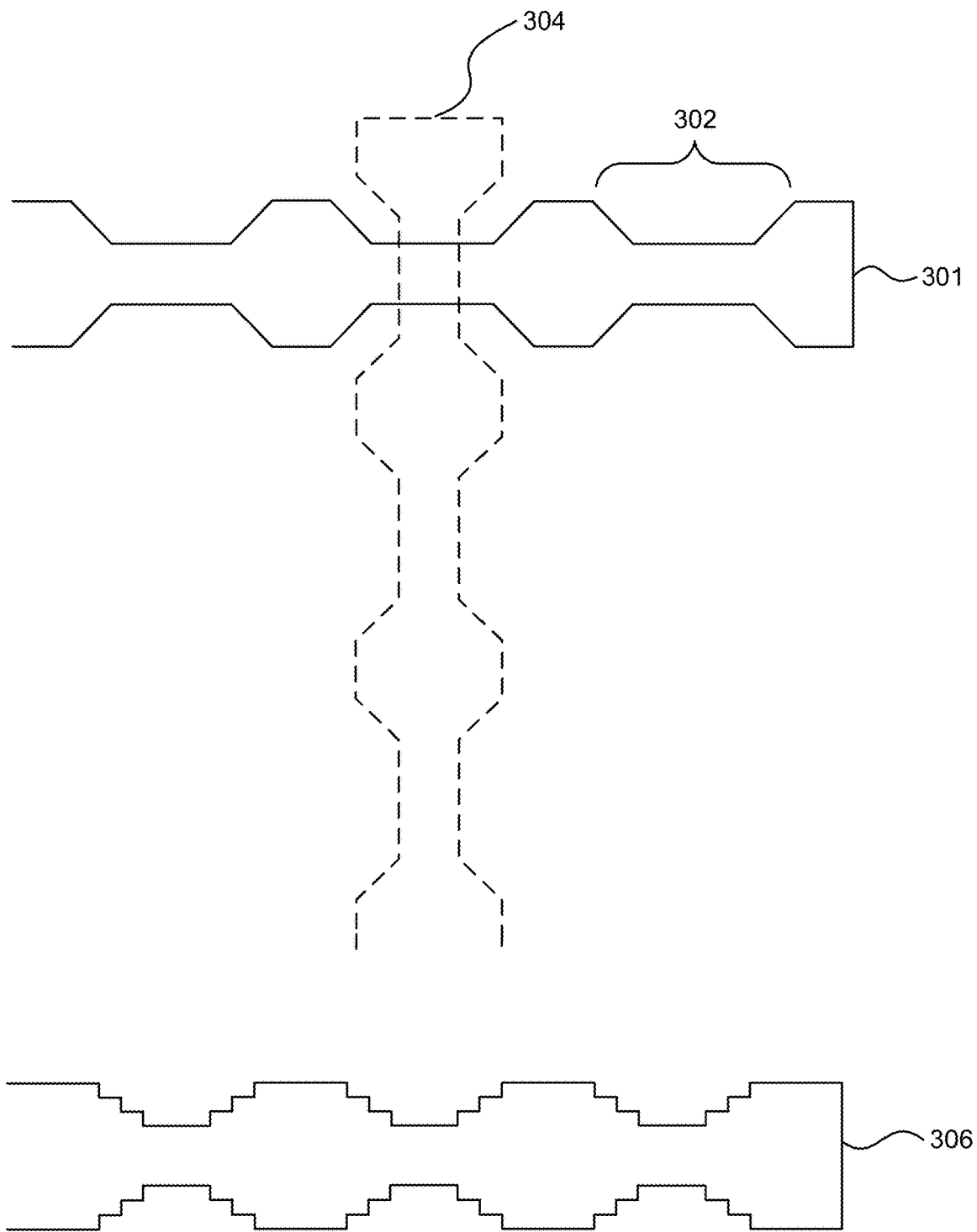
FIG. 3 shows schematic diagrams of various example RF loop antennas.

As shown in FIG. 2, the RF antennas may be substantially rectangular loop antennas with a width (as indicated by arrows 214) which is close to the sizes of wireless tag used in any objects which are to be identified. For example, the width may be around 25 mm, with typical tag diameters being 17 mm, 22 mm, 25 mm, 30 mm and 35 mm, although larger tags are available (e.g. 50 mm diameters). Alternatively, other shapes of loop antenna may be used and various examples are shown in FIG. 3. In the first example 301, there is a reduced width portion 302 and where a row/column matrix of antennas is used, the x-axis and y-axis antennas may be aligned such that the reduced width portion 302 in an x-axis antenna 301 overlaps a similar reduced width portion in a y-axis antenna 304. The second example 306 is similar to the first example 301 in that it also comprises reduced width portions; however, in this example, the shape of the reduced width portions is different.

Figure 4:
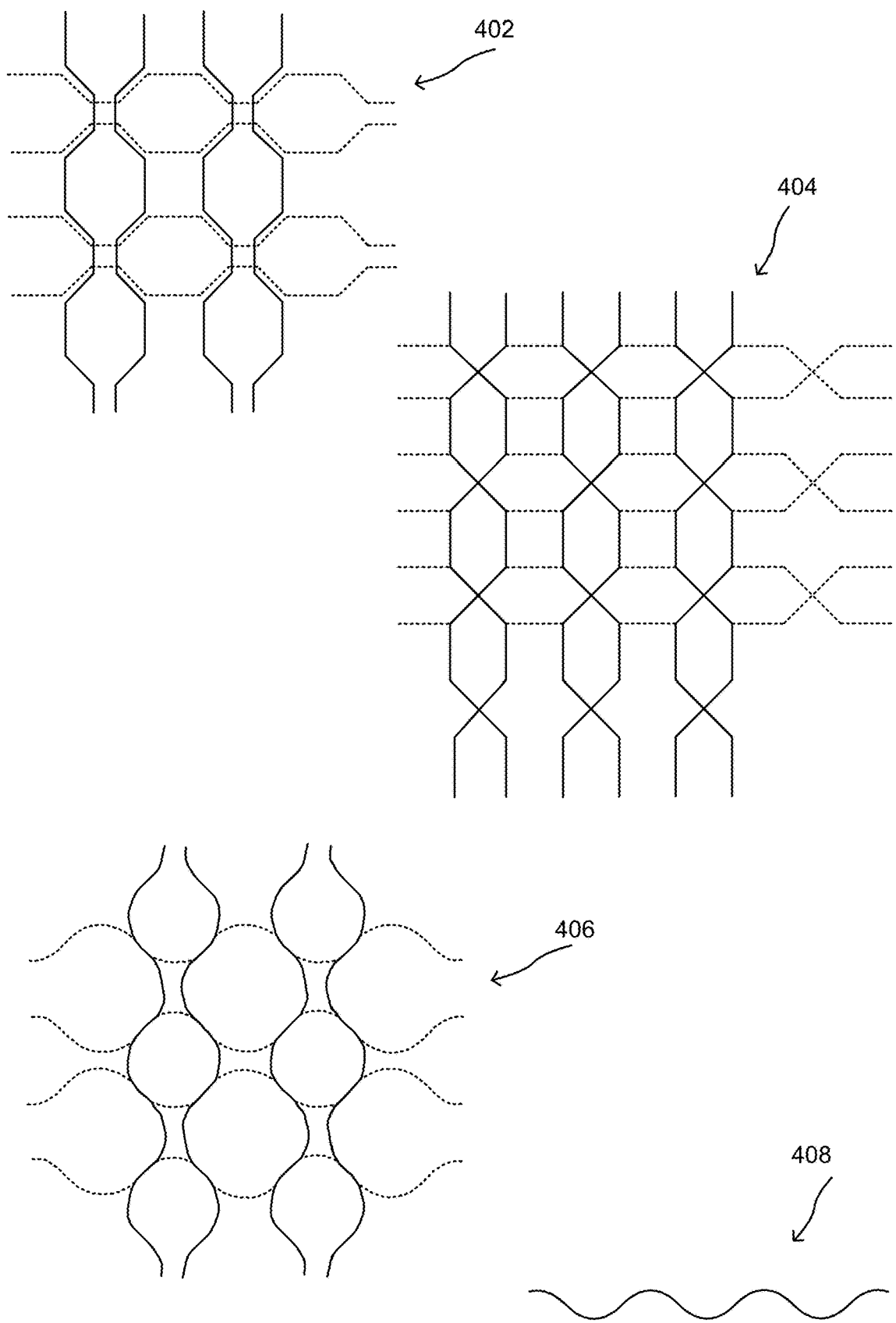
FIG. 4 shows schematic diagrams of further example RF loop antennas.

Three further examples 402-408 of RF loop antennas are shown in FIG. 4 (diagrams 406 and 408 relate to the same example, as described below). The examples 402-408 in FIG. 4 all show reduced width portions similar to those in FIG. 3 but with different shaped reduced width portions. As with the examples in FIG. 3, the reduced width portion in an x-axis antenna overlaps with a reduced width portion in a y-axis antenna. Unlike the other examples, the loop antenna in the third example 406-408 is formed from curved (rather than straight) lines and diagram 408 shows the shape of a part of a single loop antenna in this example.

The loop antennas within each of the two sets 210, 211 may be equally spaced (where this spacing, s, between antennas is not necessarily the same as the width, w, of an antenna) or unequally spaced (and as described above, in some examples the antenna array 208 may only comprise a single set of antennas). Unequal spacing may, for example, be used to achieve variable resolution at various points on the sensing surface (e.g. to provide a sensing surface with lower resolution towards the edges and higher resolution in the middle) and this may, for example, enable the same number of antennas to be used for a larger sensing surface and for a smaller sensing surface.

Figure 5:
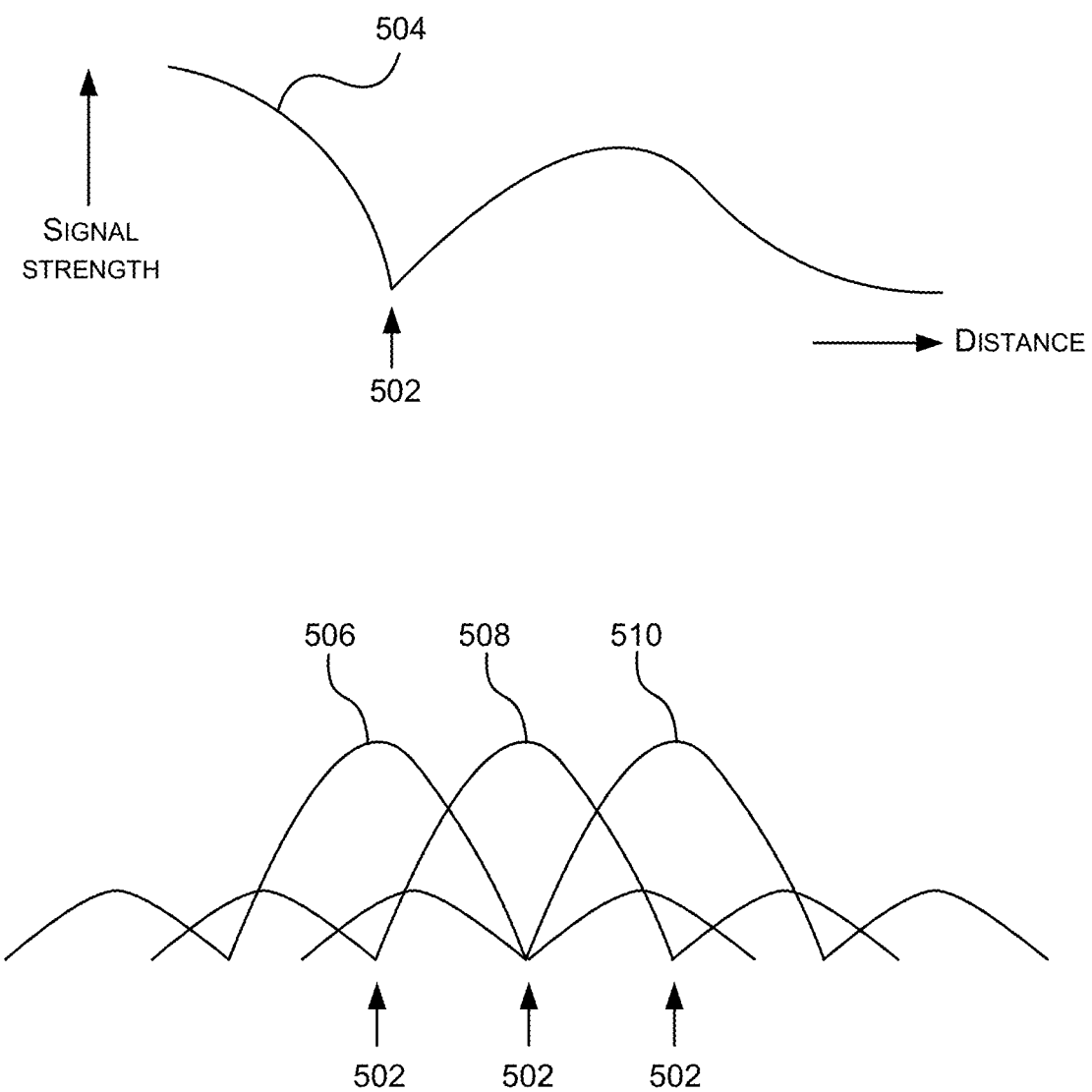
FIG. 5 is a schematic diagram illustrating the signal response of an example RF loop antenna.

In an example, the loop antennas may be spaced so as to provide good coverage of the whole surface and to alleviate the effects of any nulls 502 in the signal response of a single antenna 504. This can be described with reference to FIG. 5 which shows an example signal response of a single antenna and also how these might be overlaid to provide good response across the surface and alleviate the effects of the nulls 502. As shown in the second diagram, the RF antennas (with responses 506, 508, 510) may be spaced such that the nulls do not align and in the example shown in FIG. 5, the peak response of one antenna is substantially aligned with the null 502 of an adjacent RF antenna.

Although a matrix of RF antennas (as shown in FIG. 2) could be used to locate and identify objects (but not multi-touch inputs by a user using their fingers) without the need for a capacitive sensing electrode array 202, it would be slow and energy inefficient. Instead, the combination of the two arrays (which use different sensing technologies) as described above enables objects to be located and identified more quickly and more energy efficiently (which consequently increases the operating time between charges for a battery powered sensing surface). This combined use of the two arrays 202, 208 is described below with reference to FIG. 8.

In the example sensing surface 100 shown in FIG. 1, there is a clear distinction between the first part 108 and the second part 110. The first part 108 of the sensing surface may, for example, be formed in a multi-layer flex circuit or using an embroidery of conductive traces onto a flexible substrate (e.g. woven into a fabric) to provide a flexible, yet robust, surface area. In an example, the first part 108 may be sufficiently flexible that when not in use it can be rolled up around the second (electronics) part (which may be rigid) for storage. In other examples, however, there may be no clear distinction between the two parts (e.g. the electronics of the second part 110 may be integrated within the first part 108) or the distinction may be less (e.g. the second part may be formed in one or more additional layers underneath the first part 108).

Figure 6:
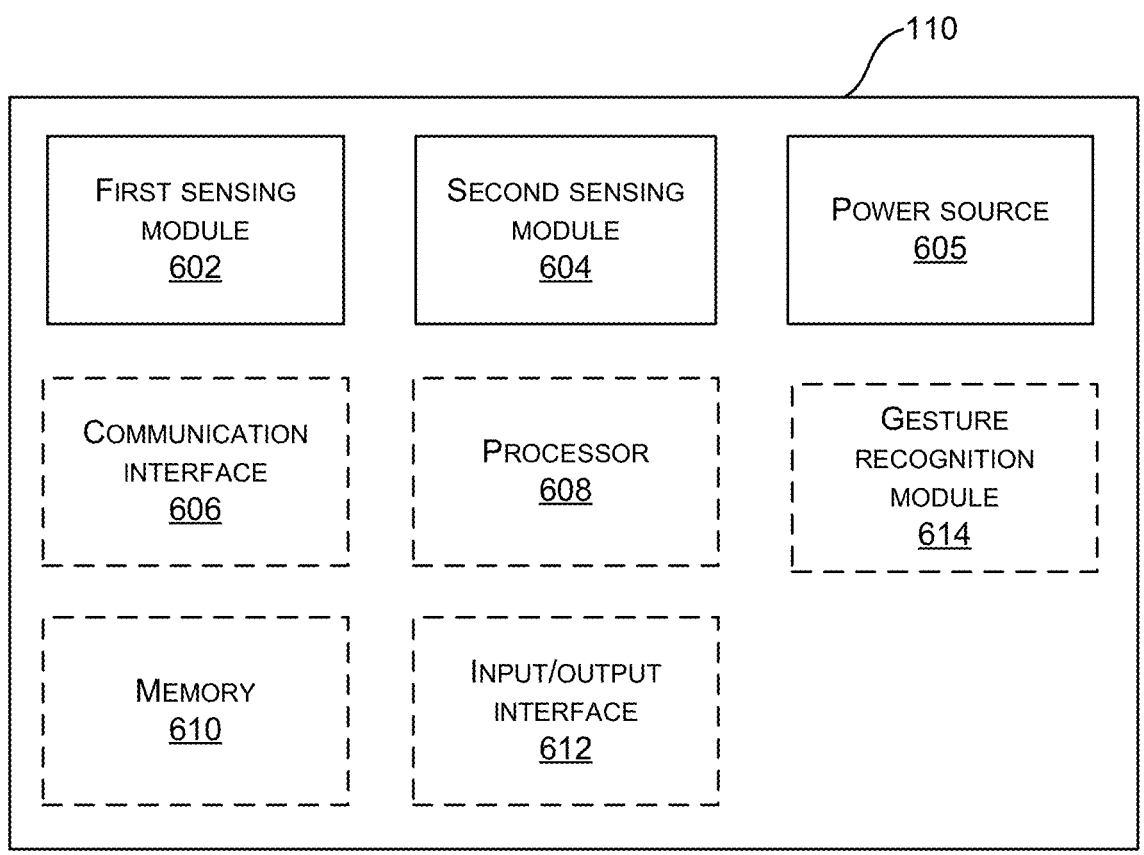
FIG. 6 is a schematic diagram showing another part of the sensing surface of FIG. 1 in more detail.

The second part 110 of the sensing surface 100 comprises the active electronics and this can be described with reference to FIG. 6. In various examples the second part 110 is permanently connected to the first part 108 and in other examples, the first part 110 may be connected to the first part 108 by one or more connectors (which connect the sensing modules to the respective arrays) such that the two parts can be decoupled by a user (e.g. to enable a user to switch between a first larger and lower resolution sensing mat and a second smaller and higher resolution sensing mat with the same number of connections and use the same active electronics). The second part 110 comprises the first sensing module 602 and the second sensing module 604 and may further comprise a power source 605 (e.g. a battery, an input connection for an external power source, etc.).

As described above, the first sensing module 602 (which may comprise a microprocessor control unit, MCU) is coupled to the capacitive sensing electrode array 202 and is configured to detect both a decrease and an increase in the capacitance between electrodes in the array. A decrease of mutual capacitance between electrodes (i.e. between one or more electrodes in the first set of electrodes 204 and one or more electrodes in the second set of electrodes 206) is used to detect a user's fingers in the same way as conventional multi-touch sensing. Unlike conventional multi-touch sensing, however, the first sensing module 602 can also detect an increase in the capacitance between electrodes in the array. An increase in mutual capacitance between electrodes (i.e. between one or more electrodes in the first set of electrodes 204 and one or more electrodes in the second set of electrodes 206) is used to detect the position, and in various examples, also the shape, of a conductive object, such as a wireless tag (e.g. an NFC or RFID tag) in a non-conductive housing or other object formed from a conductive material (without a tag). Unlike a user's finger, such an object has no connection to ground and instead it capacitive couples adjacent electrodes (consequently, the object does not need to have a high electrical conductivity and instead can be made from, or include, any conductive material).

The second sensing module 604 is coupled to the array of RF antennas 208 and is configured to selectively tune and detune the RF antennas in the array. For example, the second sensing module 604 may deactivate all but a selected one or more RF antennas and then power the selected RF antennas such that they can activate and read any proximate wireless tags (where the reading of tags using a selected antenna may be performed in the same way as a conventional NFC or RFID reader). Where more than one RF antenna is tuned and powered at the same time, these antennas are selected to be sufficiently far apart that there is no effect on one powered RF antenna from any of the other powered RF antennas. The deactivation of an RF antenna may be implemented in many different ways, for example by shorting the two halves of the loop via a transistor or making the tuning capacitors (which would otherwise tune the antenna at the right frequency)

open-circuit (using a transistor). This selective tuning and detuning of the RF antennas stops the antennas from coupling with each other (e.g. such that the power is not coupled into another antenna, which may then activate tags proximate to that other antenna and not the original, powered antenna). The second sensing module 604 may be further configured to connect all the RF antennas to ground when the first sensing module 602 is operating. This prevents the capacitive sensors from sensing activity on the non-touch-side of the sensing mat (e.g. legs under the table) and provides the capacitive return path to ground (which completes the circuit of the user's finger to the sensing electrodes to ground and to the user's body).

Depending upon the implementation of the sensing surface 100, the second part may also comprise a communication interface 606 arranged to communicate with a separate computing device 102 using a wired or wireless technology. In examples where the power source 605 comprises an input connection for an external power source (e.g. a USB socket) and the communication interface 606 uses a wired protocol (e.g. USB), the communication interface 606 and power source 605 may be integrated. In various examples, the communication interface 606 may, in addition or instead, be arranged to communicate with an object 106 (e.g. following identification of the module by the second sensing module 604).

Figure 7:
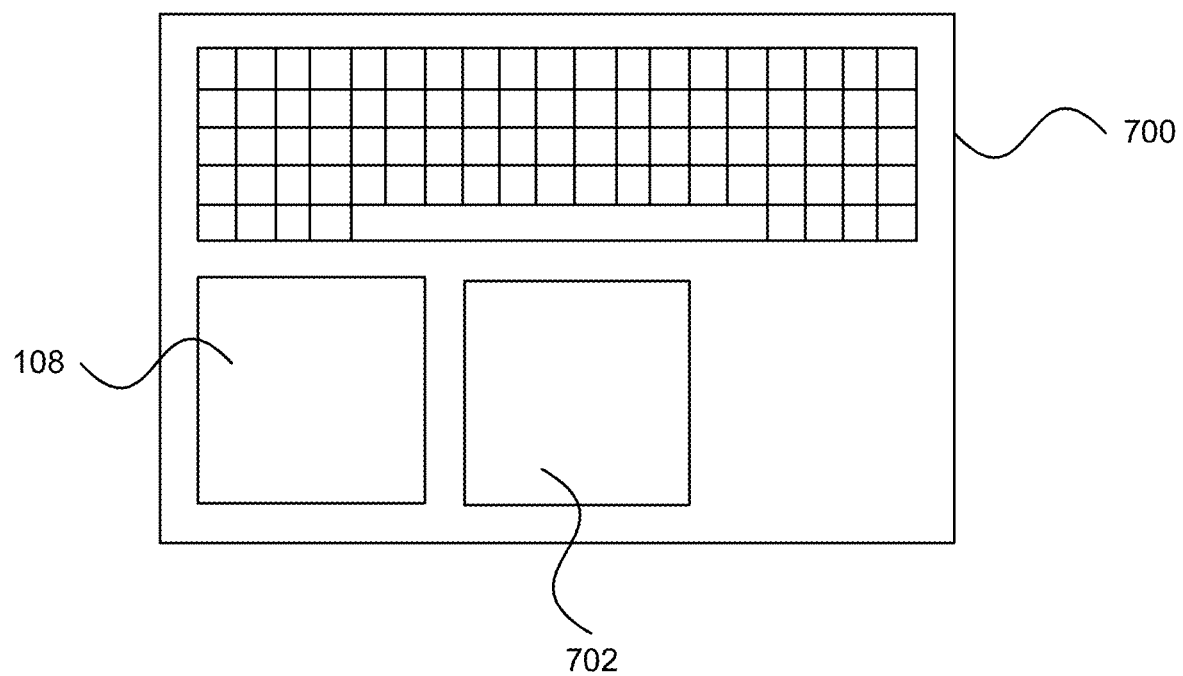
FIG. 7 is a schematic diagram shown an example implementation of a multi-modal sensing surface.

In various examples, the sensing surface 100 may be integrated with a computing device such that the second part 110 further comprises the component parts of the computing device, such as a processor 608, memory 610, display interface 612, etc. In other examples, the sensing surface 100 may be integrated within a peripheral for a computing device e.g. within a keyboard 700 as shown in FIG. 7. FIG. 7 shows a keyboard 700 with the first part 108 of the sensing surface providing a multi-modal sensing region to one side of the track pad 702. This keyboard 700 may be a peripheral device (e.g. for a laptop, tablet or games console) or may be an integral part of a laptop computer.

In various examples, the sensing surface 100 may be arranged to detect gestures above the surface of the first part 108 as well as fingers or conductive objects in contact with the surface (using the two arrays and the two sensing modules as described above). The second part 110 may therefore additionally comprise a gesture recognition module 614 coupled to the capacitive sensing electrode array 202 (or this functionality may be incorporated within the first sensing module 602).

The functionality of one or both of the sensing modules 602, 604 and/or the gesture recognition module 614 described herein may be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In examples where the sensing surface 100 is integrated with a computing device such that the second part 110 further comprises the component parts of the computing device, such as a processor 608, memory 610, input/output interface 612, etc. the processor 608 may be a microprocessor, controller or any other suitable type of processor for processing computer executable instructions to control the operation of the device in order to implement functionality of the computing device (e.g. to run an operating system and application software).

The operating system and application software may be provided using any computer-readable media that is accessible by the sensing surface 100. Computer-readable media may include, for example, computer storage media such as memory 610 and communications media. Computer storage media, such as memory 610, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage media (memory 610) is shown within the sensing surface 100 it will be appreciated that the storage may be distributed or located remotely and accessed via a network or other communication link (e.g. using communication interface 606).

The sensing surface 100 may also comprise an input/output interface 612 arranged to output display information to a display device which may be separate from or integral to the sensing surface 100. The display information may provide a graphical user interface. The input/output interface 612 may also be arranged to receive and process input from one or more devices, such as a user input device (e.g. a mouse, keyboard, camera, microphone or other sensor). In some examples the user input device may detect voice input, user gestures or other user actions and may provide a natural user interface (NUI). The input/output interface 612 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Figure 8:
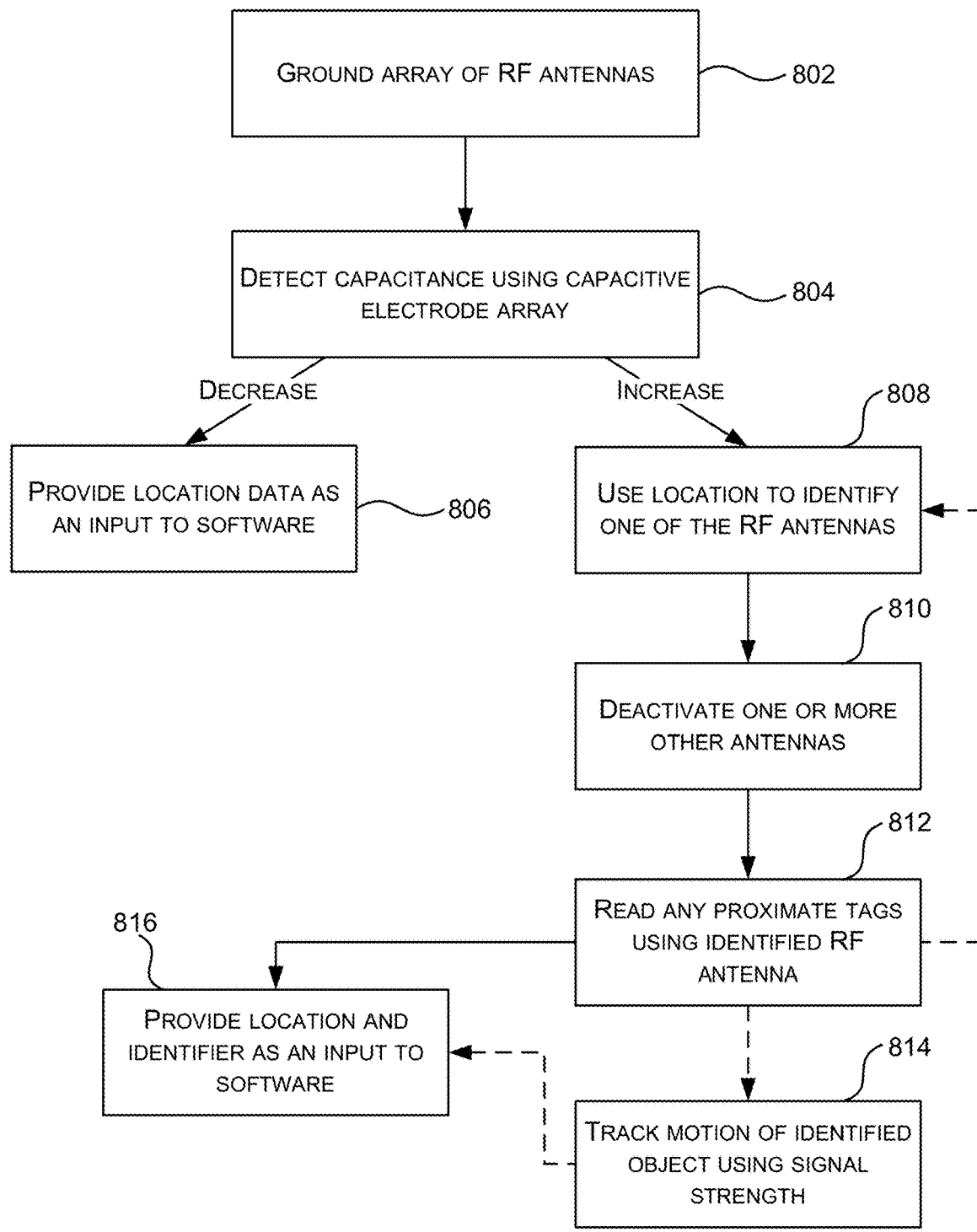
FIG. 8 is a flow diagram showing an example method of operation of a multi-modal sensing surface.

FIG. 8 is a flow diagram showing an example method of operation of the sensing surface 100. Whilst all the RF antennas (in array 208) are grounded (block 802, by the second sensing module 604), the sensing surface 100 can detect changes in capacitance using the capacitive electrode array 202 (block 804, by the first sensing module 602). If the first sensing module detects a decrease in capacitance at a location on the sensing surface (in block 804), this location is provided as an input to software (block 806, e.g. where the software may be running on a processor 608 in the sensing surface 100 or in a separate computing device).

If the first sensing module detects an increase in capacitance at a location on the sensing surface (in block 804), the location is used to identify one of the RF antennas (block 808, by the second sensing module 604) and then all other RF antennas are deactivated (block 810, by the second sensing module 604). The identified RF antenna (which has not been deactivated in block 810) is then used to read any proximate wireless tags (block 812, by the second sensing module 604).

The reading of a proximate wireless tag (in block 812) comprises activating the tag and then reading data transmitted by the activated tag. The tag is activated by the RF power coupled to it from the antenna and if the tag is a passive tag, this coupled RF power also provides sufficient power to enable the tag to transmit the data (which comprises an ID for the tag). In various examples, the power which is coupled from the RF antenna to the tag may also power other functionality within the object, such as a flashing LED within the object.

In some examples, the location which is identified (in block 804, by the first sensing module 602) may be between two RF antennas in the same set (e.g. set 210 or set 211 in FIG. 2) and/or correspond one RF antenna in each set of antennas 210, 211. In such examples, blocks 808-812 may be repeated for each RF antenna that corresponds to the location. Where blocks 808-812 are repeated for two RF antennas in the same set, the relative signal strengths of the data received from the wireless tag(s) may be used to provide further location information between the object (e.g. by interpolating between the positions of the two RF antennas, which may be used to disambiguate between a user touch or a generic conductive object and an intentionally wireless-tagged object) and/or to distinguish between multiple tags (where multiple tags can be read by either or both of the two RF antennas). Where blocks 808-812 are repeated for two RF antennas in different sets (i.e. one from each set), this may be used to correctly identify objects where there is more than one object on the sensing surface such that either or both of the RF antennas can read multiple wireless tags (e.g. with the correct tag for the location being the one that is read by both the antennas).

Having located and identified an object with a wireless tag on the sensing surface using the method described above, the method (i.e. blocks 802-812) may be repeated to track any movement of the identified object. Alternatively, the tracking of an object may be performed based on signal strength (block 814, i.e. based on the strength of the signal received from the wireless tag) without reading (i.e. decoding) the data transmitted by the tag repeatedly and this may be less susceptible to noise than only using the capacitive sensing to track location (in block 804) because the capacitive sensing may detect both the object (which results in an increase in capacitance between electrodes in the array 202) and a user's hand holding and moving the object (which results in a decrease in capacitance between electrodes in the array 202). Furthermore, by detecting whether an object is being touched or picked up by a user or not, this may be provided as additional input data to software (in block 816).

The location data and object identifier (as read from the wireless tag) which are determined (in blocks 804 and 808-812) are then provided as an input to software (block 816, e.g. where the software may be running on a processor 608 in the sensing surface 100 or in a separate computing device). If the object which caused the increase in capacitance (as detected in block 804) does not include a wireless tag, no object ID will be read by the second sensing module 604 (in block 812) in which case, only location information will be provided as an input to software (in block 816).

If a change in capacitance is detected at more than one location (in block 804) the subsequent blocks in the method of FIG. 8 may be repeated and depending upon the particular situation, the subsequent blocks may be implemented serially or in parallel for each of the locations. For example, if there is one or more location where a decrease in capacitance is detected (in addition to none, one or more location where an increase in capacitance is detected), then all these locations where a decrease was detected may be provided in parallel as an input to software (in block 806).

Figure 9:
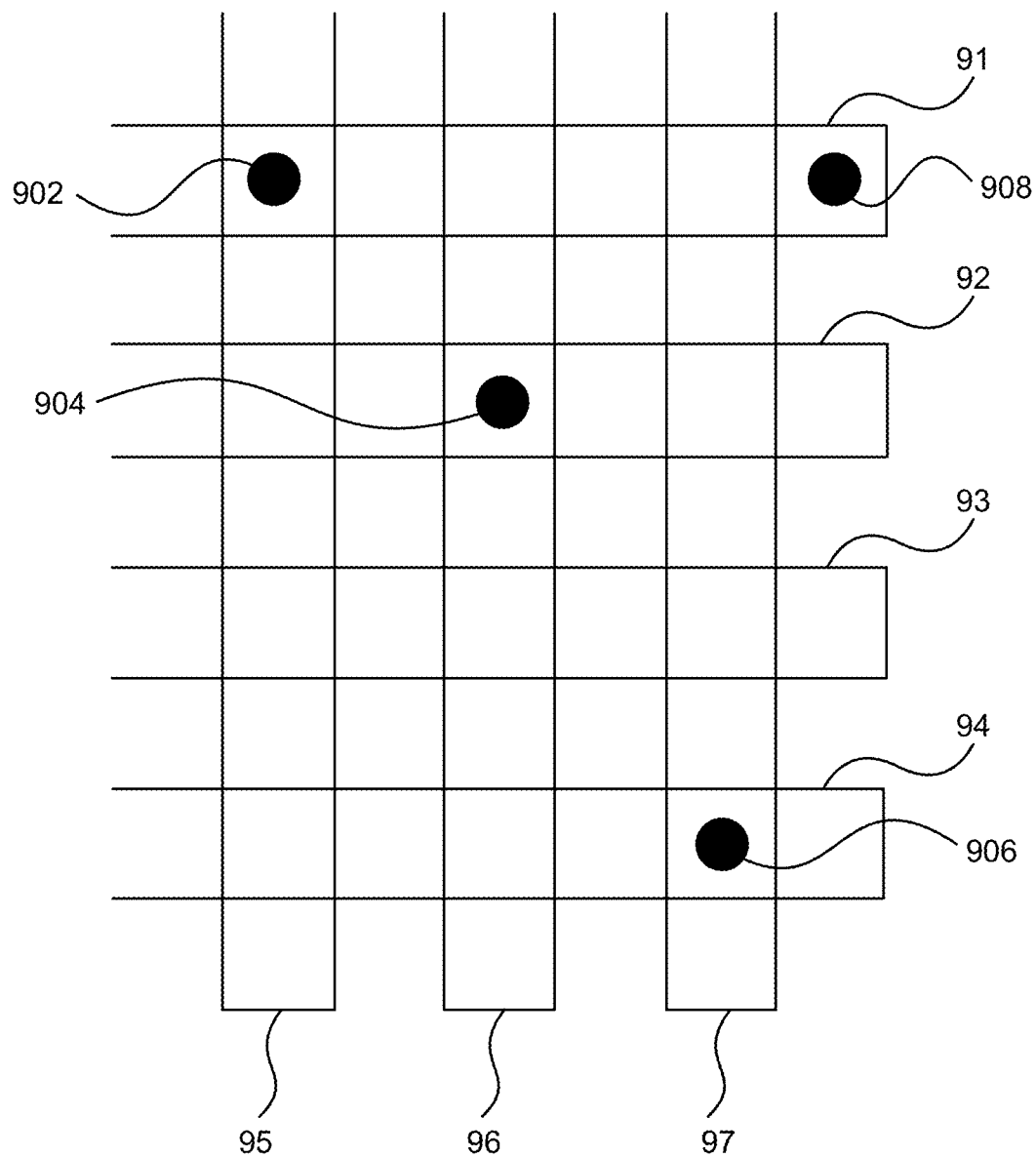
FIG. 9 is a schematic diagram showing a plurality of RF antennas.

If there is one or more location where an increase in capacitance is detected (in addition to none, one or more location where a decrease in capacitance is detected), then if the locations are close together but do not correspond to the same RF antenna (e.g. locations 902 and 904 in FIG. 9), the subsequent method blocks (blocks 808-816) may be performed in turn (i.e. serially) for each location. For example by first identifying RF antenna 91 (in block 808), deactivating the other RF antennas 92-97 (in block 810) and reading any tags in any objects proximate to RF antenna 91, which includes the object at location 902 (in block 812). The method blocks may then be repeated in which the y-axis RF antenna corresponding to location 902 (antenna 95) is identified (in block 808), e.g. to distinguish between IDs read if there is also an object with a tag present at location 908. The method then proceeds by identifying RF antenna 92 (in block 808), deactivating the other RF antennas 91, 93-97 (in block 810) and reading any tags in any objects proximate to RF antenna 92, which includes the object at location 904 (in block 812). As before, the method blocks may then be repeated in which the y-axis RF antenna corresponding to location 904 (antenna 96) is identified (in block 808).

If instead the two detected locations (from block 804) are far apart (e.g. locations 902 and 906 in FIG. 9), the subsequent method blocks (blocks 808-816) may be performed serially or in parallel for each location. For example by first identifying RF antennas 91 and 94 (in block 808), deactivating the other RF antennas 92, 93, 95-97 (in block 810) and reading any tags in any objects proximate to RF antennas 91 and 94, which includes the objects at locations 902 and 906 (in block 812). The method blocks may then be repeated in which the y-axis RF antennas corresponding to locations 902 and 906 (antennas 95 and 97) are identified (in block 808).

If instead the two detected locations (from block 804) correspond to the same RF antenna (e.g. locations 902 and 908 in FIG. 9), the subsequent method blocks (blocks 808-816) may be performed serially or in parallel for each location. For example by first identifying RF antenna 91 (in block 808), deactivating the other RF antennas 92-97 (in block 810) and reading any tags in any objects proximate to RF antenna 91, which includes the objects at locations 902 and 908 (in block 812). To distinguish between the tags (and hence IDs) read, the method blocks may then be repeated, serially or in parallel, in which the y-axis RF antennas corresponding to locations 902 and 908 (antennas 95 and 97) are identified (in block 808).

Locations may, for example, be determined to be 'close together' for this purpose if they correspond to adjacent RF antennas (e.g. as for locations 902 and 904 in FIG. 9) and locations may be determined to be 'far apart' for this purpose if, for example, they do not correspond to the same or adjacent RF antennas. In other examples and depending upon how the signal response of the individual RF antennas overlap, the locations may need to be further apart (e.g. corresponding to more widely separated RF antennas) in order that the method can proceed in parallel.

In addition to detecting the location of an object on the sensing surface (in block 804, using the first sensing module 602 and the capacitive sensing electrode array 202) and the identity of the object, if it contains a wireless tag (in block 812, using the second sensing module 604 and the array of RF antennas 208), the orientation of an object may also be determined. The orientation may be determined using the first sensing module 602 (as part of block 804 e.g. where the object is shaped such that its orientation can be determined from the shape of the region with increased capacitance) and/or the second sensing module 604 (as part of block 812 or 814 e.g. where the object two or more wireless tags which are physically spaced apart or where an antenna in the wireless tag in the object is shaped and hence is directional, for example by using a dipole rather than a coil). Determining the orientation using the first sensing module 602 is likely to be a lower power solution than using the second sensing module 604. Where the orientation of an object is determined (in any of blocks 804, 812 and 814) this may also be provided as an input to software (in block 816).

Two example form factors of the sensing surface are shown in FIGS. 1 and 7. The sensing surface shown in FIG. 1 may be referred to as a sensing mat and the sensing surface shown in FIG. 7 is integrated into a keyboard (which may be a peripheral device for a computing device, integrated into a cover for a computing device or an integral part of a computing device). As the first part 108 can be flexible, pliable and/or stretchable, the sensing surface may have many different form factors. It may, for example, be integrated into a wearable item (e.g. into a piece of clothing, with the second part 110 being removable for washing by disconnecting it from the two arrays). In another example, the sensing surface may be embedded into a surface (e.g. the surface of a desk or table or into a wall or a dashboard/fascia in a vehicle). In various examples, the sensing surface may be non-planar (e.g. it may be curved or undulating). In an example, the first part 108 may be a stretchy cover which may be fitted over another object (e.g. to turn an object, which be a passive object, into a sensing input device).

Figure 10:
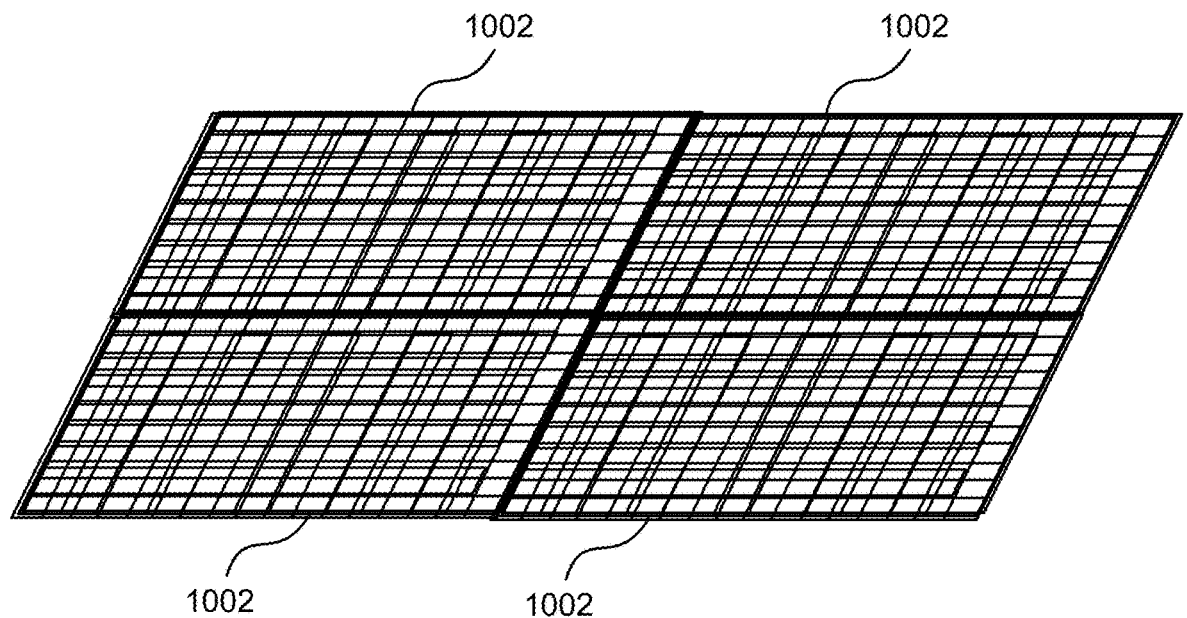
FIG. 10 is schematic diagram showing a tiled arrangement of the capacitive sensing electrode array and array of RF antennas.

The sensing surface may have any size, e.g. it may be small (e.g. less than 100 cm$^2$, as in the example in FIG. 7) or much larger. The two arrays (the capacitive sensing array 202 and the array of RF antennas 208) may be scaled to the size of the surface. For some form factors it may not be possible to scale up the RF antenna arrays such that they can cover the entire surface because the antennas may become self-resonant; however, in such implementations, the configuration shown in FIG. 2 (which may be considered to be a single 'tile' 1002) may be repeated two or more times (e.g. as shown in FIG. 10) with the pairs of arrays either sharing common active electronics or having at least partially separate active electronics for each tile 1002. For example, each tile 1002 may share some elements of the second part 110 (e.g. the power source 605) and other elements may be replicated for each tile 1002 (e.g. the first and second sensing modules 602, 604, where these may, for example, be embedded in each tile and report to a central processor that integrates the data from all the tiles).

Although FIG. 10 shows the tiling of both the capacitive sensing electrode array and the array of RF antennas, in other examples, the array of RF antennas may be tiled (i.e. repeated) across the surface of the sensing surface and there may be a single, large capacitive sensing electrode array which extends across the sensing surface. In such an example there may be a single first sensing module 602 and multiple second sensing modules 604 (e.g. one second sensing module 604 coupled to each array of RF antennas (i.e. to each tile).

The sensing surface described above provides a portable sensing area which can detect both multi-touch inputs (e.g. a user's fingers) and objects placed on the surface and if those objects include a wireless tag, the surface can also identify the objects. The use of the combination of capacitive sensing and RF sensing provides a sensing device which has a lower power consumption than a purely RF solution and hence a longer battery life where the sensing device is battery powered. The location and identification of objects can also be performed more quickly than a purely RF solution.

Although the present examples of a multi-modal sensing surface are described and illustrated herein as being implemented in a system as shown in FIG. 1, the system described is provided as an example and not a limitation. As those skilled in the art will appreciate, the present examples are suitable for application in a variety of different types of computing systems and the sensing surface may be implemented in many different form factors, at different scales and may or may not be integrated into another computing device or object. Furthermore, although in the examples shown in FIGS. 1 and 7, the sensing surface is in a horizontal orientation such that the user contacts an upper surface of the first part (which may be referred to as the 'touch surface), in other examples, the sensing surface may be positioned vertically (e.g. such that the array of RF antennas may be described as being behind the capacitive sensing electrode array with a user touching the front surface of the first part, such that this front surface is the touch surface in this configuration) or the first part may be non-planar (e.g. with a user touching an exposed surface of the front part which is therefore the touch surface and the array of RF antennas being behind the capacitive sensing electrode array). Although not shown in the diagrams, the touch surface may provide a protective cover for the adjacent array which in many examples will be the capacitive electrode sensing array 202 or, where no protective cover is provided, the touch surface may be the capacitive electrode sensing array.

Figure 11:
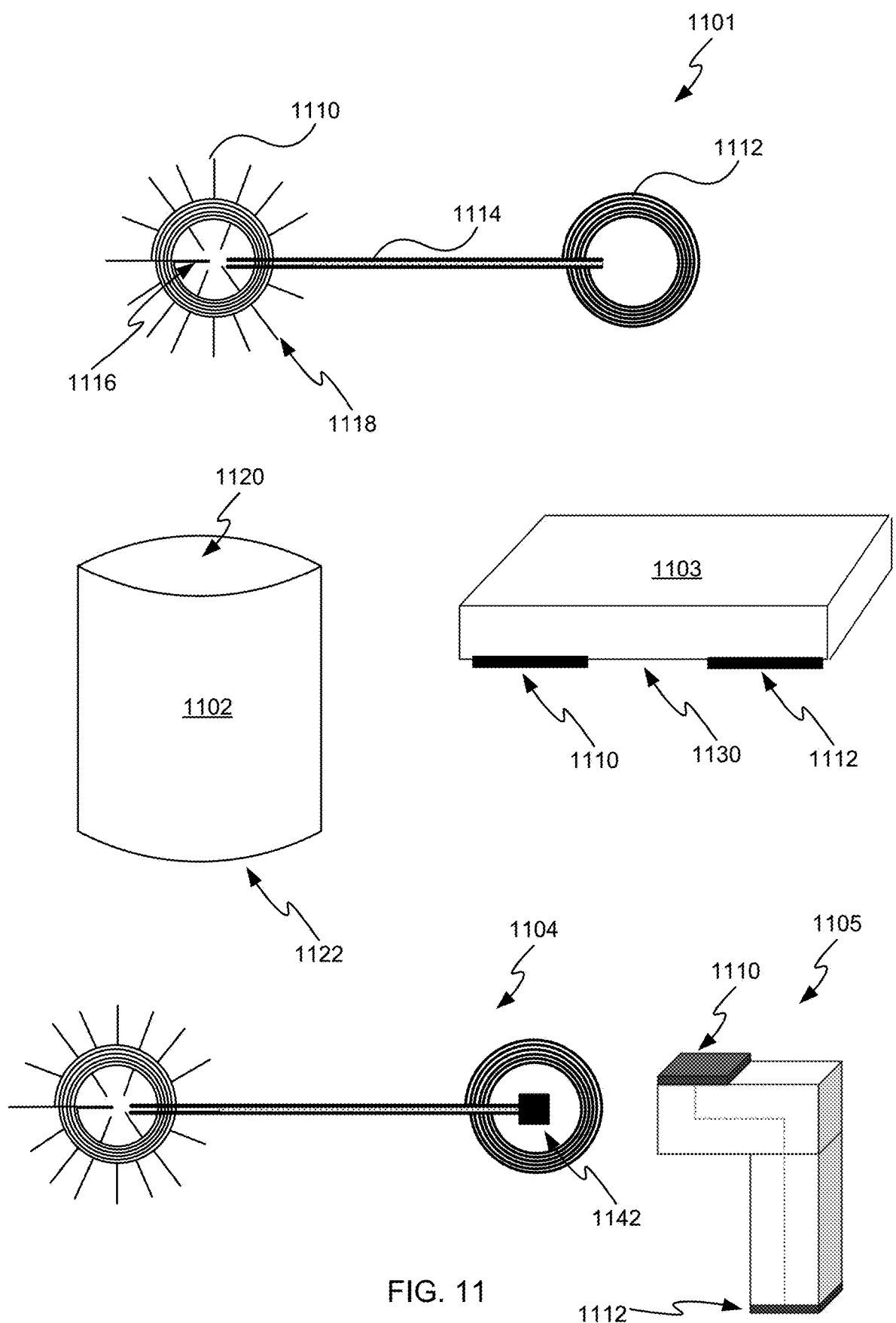
FIG. 11 shows schematic diagrams of various example extender objects which can be used with a multi-modal sensing surface, such as the one shown in FIG. 1.

FIG. 11 shows schematic diagrams of various example extender objects 1101-1105 which can be used with the multi-modal sensing surface described herein (e.g. as shown in FIG. 1) or with any other multi-modal sensing surface which comprises both capacitive touch sensing and sensing of short-range wireless tags. The extender object comprises two spatially separated antenna coils 1110, 1112 which are electrically connected together (e.g. by wires 1114) and so can be used to extend the range of the multi-modal sensing surface to sense short-range wireless tags. As described above, the position of any touch events which are detected by the multi-modal sensing surface via the extender objects described herein may be provided as an input to software (e.g. in block 806 of FIG. 8).

As shown in FIG. 11, at least one of the two antenna coils comprises a plurality of radial elements 1116, 1118 which extend in or out from the coil 1110. Although in FIG. 11 only the first antenna coil 1110 comprises these radial elements, in other examples both antenna coils may comprise radial elements where the radial elements may be the same or different in the coils.

As described above, the two antenna coils 1110, 1112 are spatially separated and two example configurations are shown in FIG. 11. In the first example, the extender object 1102 has the two antenna coils on two opposing faces 1120, 1122. In the second example, the extender object 1103 has the two antenna coils spatially separated on the same face 1130. It will be appreciated that the extender object may have any shape and the antenna coils may be placed in any spatially separated positions on any surface of the extender object, e.g. as shown in the fifth example 1105 in FIG. 11.

When use for extending the short-range wireless sensing of a multi-modal sensing surface, the first antenna coil 1110 in the extender object couples with an antenna coil in the short-range wireless tag and the second antenna coil 1112 in the extender object couples with an RF antenna in the multi-modal sensing surface. As described above, the two antenna coils additionally extend the capacitive touch sensing of the multi-modal sensing surface and when used to extend the capacitive touch sensing, the second antenna coil 1112 in the extender object is in contact with the multi-modal sensing surface (e.g. the antenna coil without the radial elements, in this example) and the first antenna coil 1110 (e.g. the one with the radial elements) is spatially separated from the sensing surface and provides the extended touch area.

Figure 12:
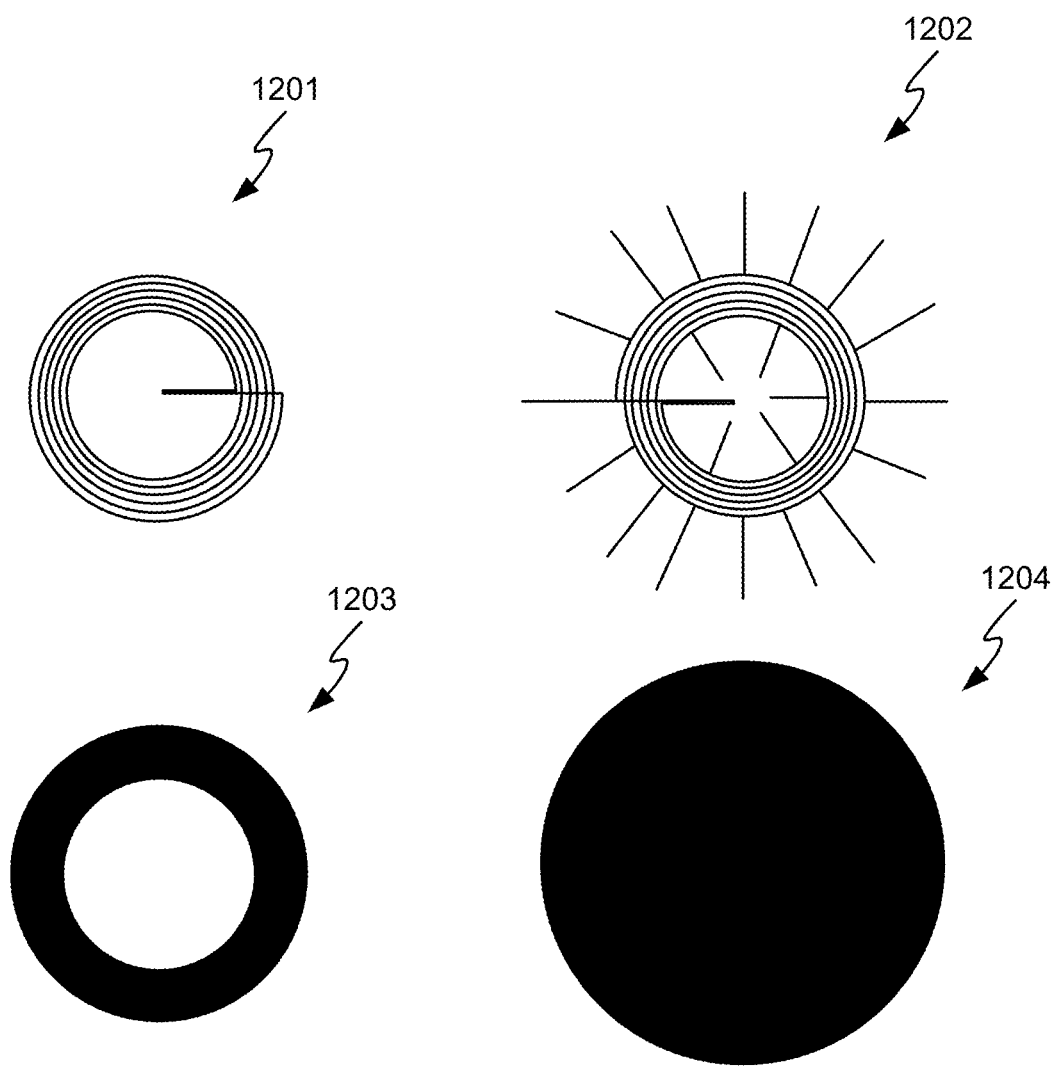
FIG. 12 is a schematic diagram showing the operation of the extender object shown in FIG. 1.

The radial elements (or spokes) 1116, 1118 extend the touch area which can be detected using the multi-modal sensing surface and so improve the touch detection performance as can be described with reference to FIG. 12. The upper two diagrams 1201, 1202 in FIG. 12 show two different antenna coil designs—the first, 1201, does not include any radial elements and the second, 1202, includes a plurality of radial elements. The two lower diagrams 1203, 1204 show examples of the areas which are sensitive to touch for the two antennas shown in the upper diagrams 1201, 1202 and it can be seen that by adding the radial elements, the area which is sensitive to touch changes from a hollow circle (as in diagram 1203) where touch cannot be detected in the center to a larger filled circle (as in diagram 1204). It will be appreciated that if, instead the radial elements only extended into the center from the antenna coil then the area which is sensitive to touch may be a filled circle that is the same size as the hollow circle shown in FIG. 12 (in diagram 1203) and if instead the radial elements only extended out from the antenna coil, then the area which is sensitive to touch may be the same size as the larger circle shown in FIG. 12 (in diagram 1204) but may be hollow.

In addition to (or instead of) adding the radial elements to one or both of the antenna coils to improve the touch sensing of the extender object, one or both of the antenna coils may comprise thicker traces than a standard antenna coil (e.g. thicker traces than are necessary for functioning as an NFC coil). This goes against known principles which would suggest making the traces as thin as can be made without breaking.

In various examples, the extender object 1104 may additionally comprise an IC 1142 (e.g. an NFC IC) connected to one of the antennas 1110, 1112. If the extender object comprises such an IC, the multi-modal sensing surface will be able to detect and identify the extender object (e.g. using an identifier stored within the IC which is communicated to the multi-modal sensing surface via the antenna coil which is in contact with the multi-modal sensing surface). In the absence of such an IC, the extender object is invisible to the second sensing module and array of RF antennas.

In the examples shown in FIG. 11, the extender object comprises two antenna coils 1110, 1112 connected together in a 1:1 relationship. In other examples, the extender object may comprise more than one antenna coil on a single face or more than one antenna coil on multiple (e.g. both) faces and various examples are shown in FIG. 13.

Figure 13:
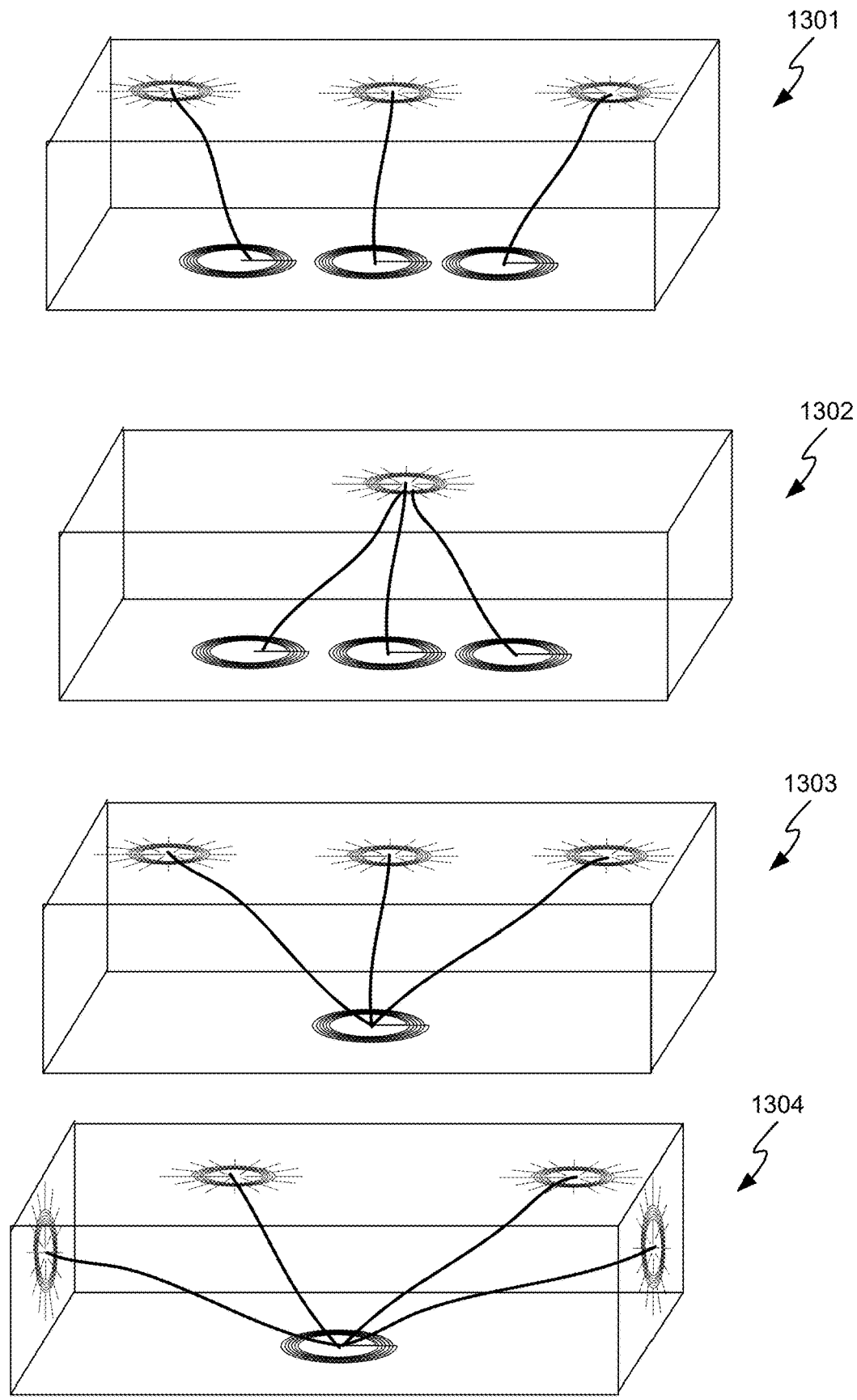
FIG. 13 shows schematic diagrams of various other example extender objects which can be used with a multi-modal sensing surface, such as the one shown in FIG. 1.

The first example in FIG. 13 shows a multiple 1:1 configuration in which the extender object 1301 comprises the N antenna coils on one face (where N is an integer and in this example N=3) and N antenna coils on a second face (which in this example is an opposite face and is in contact with the multi-modal sensing surface) and each antenna coil on the first face is connected directly to a single antenna coil on the second face. This configuration may enable different points on the multi-modal sensing surface to be extended to different points in space (e.g. spatially close points on the multi-modal sensing surface may be extended to spatially separate points in space, where these spatially separate points may be on the same face of the extender object or on different faces).

The second example in FIG. 13 shows a many:1 configuration in which the extender object 1302 comprises one antenna coil on one face (e.g. a face which is not in contact with the multi-modal sensing surface) connected to N antenna coils on a second face (which in this example is an opposite face and is in contact with the multi-modal sensing surface). This configuration has a smaller footprint on the multi-modal sensing surface.

The third example in FIG. 13 shows a 1:many configuration in which the extender object 1303 comprises N antenna coils on one face (e.g. a face which is not in contact with the multi-modal sensing surface) connected to a single antenna coil on a second face (which in this example is an opposite face and is in contact with the multi-modal sensing surface). This configuration may provide more robust sensing by allowing the short-range wireless tag or touch event to be detected by more than one row/column of RF antennas/electrodes. Additionally, the configuration may enable a short-range wireless tag to draw more power from the electromagnetic field generated by a plurality of RF antennas (e.g. if their phases are synchronized).

In the first three examples shown in FIG. 13, the antenna coils are positioned on opposite faces of an extender object 1301-1303. In other examples, however, the antenna coils may be spatially separated on the same face of an extender object, as shown in one of the examples 1103 in FIG. 1 or they may be positioned on multiple faces of an extender object 1304, as shown in the fourth example in FIG. 13.

In the examples shown in FIG. 13, the antenna coils which are in contact with the multi-modal sensing surface do not comprise radial elements and the other antenna coils do comprise radial elements. In other examples; however, the antenna coils which are in contact with the multi-modal sensing surface may comprise radial elements and/or one or more of the antenna coils that are not in contact with the multi-modal sensing surface may not comprise radial elements. In examples where all the antenna coils comprise radial elements, the extender elements may be used either way up (e.g. to provide a 1:many or a many:1 configuration using the same extender object).

Figure 14:
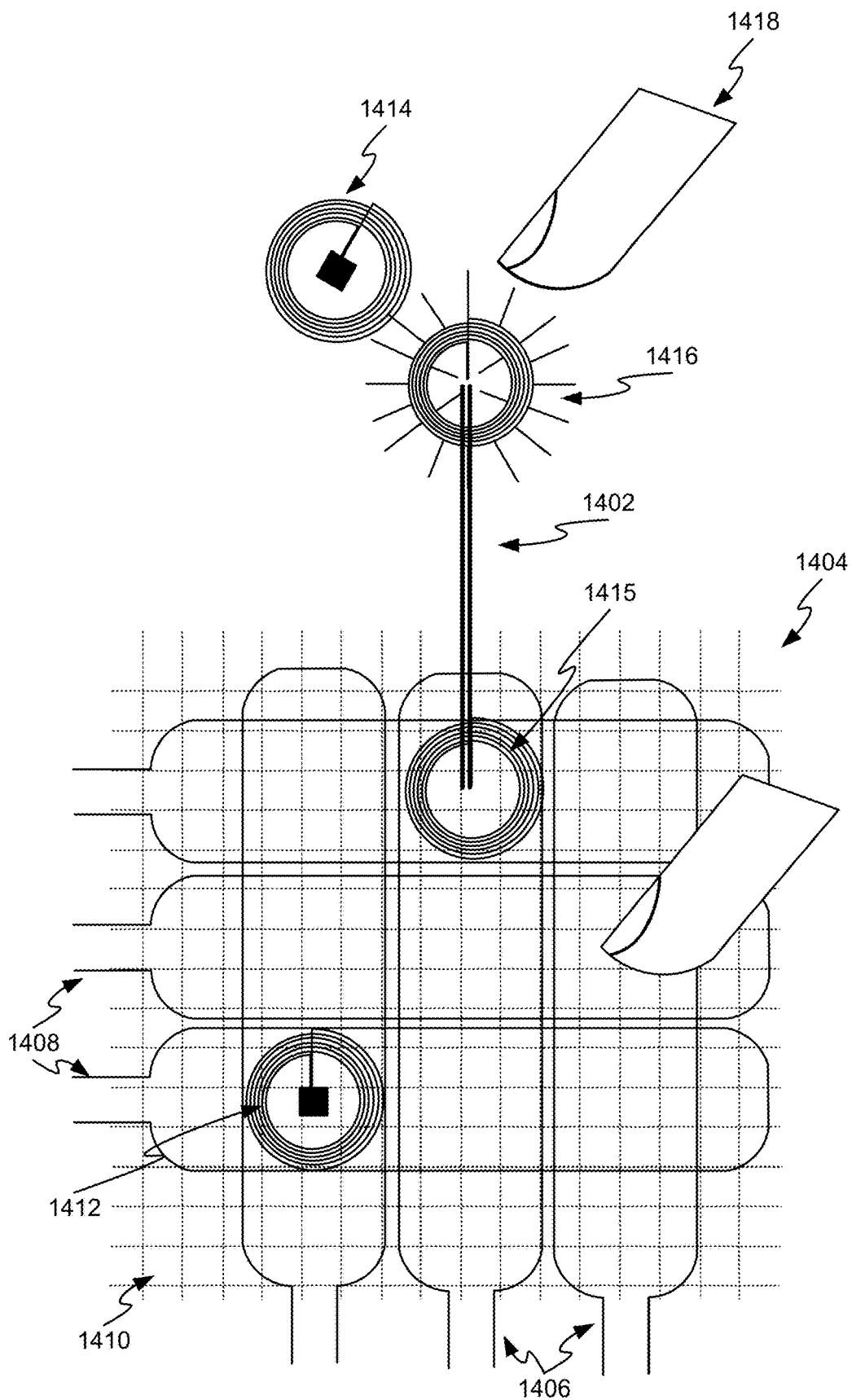
FIG. 14 shows a schematic diagram of an extender object on a multi-modal sensing surface.

FIG. 14 shows a schematic diagram of an extender object 1402 on a multi-modal sensing surface 1404 comprising two arrays of RF antennas 1406, 1408 and a capacitive sensing electrode array 1410. A standard short-range wireless tag 1412 is shown on the sensing surface 1404. If a user places a short-range wireless tag 1414 on the distal end of the extender object (i.e. proximate to antenna coil 1416 which comprises a plurality of radial portions), the tag is detected by the sensing surface 1404 (e.g. by the RF antenna arrays 1406, 1408) as if it is placed on the surface at the position of the proximal end of the extender object (i.e. in the position of the second antenna coil 1415 in the extender object). Similarly, if a user touches the distal end of the extender object (i.e. if they place their finger 1418 on antenna coil 1416 which comprises a plurality of radial portions), the tag is detected by the sensing surface 1404 (e.g. by the capacitive sensing electrode array 1410) as if the user touched the surface at the position of the proximal end of the extender object (i.e. in the position of the second antenna coil 1415 in the extender object).

Although not shown in any of the diagrams, in some examples, extender objects may be stacked on top of each other.

Although the example extender objects shown in FIGS. 11 and 13 are depicted as being cylindrical or cuboid in shape, it will be appreciated that this is by way of example and an extender object may have any shape (e.g. it may be shaped like a person, a miniature building, etc.) and in various examples the extender objects may be play pieces which are part of a set of play pieces (which may have different shapes).

Use of extender objects as described herein enables touch sensing to be extended away from the flat, featureless surface of the multi-modal sensing surface as well as extending sensing of short-range wireless tags. There are many applications where this extension away from the flat sensing surface is beneficial, for example, it may facilitate user input by visually impaired users, users who are less dexterous (e.g. young children or the elderly) who may find it easier to locate and touch objects placed on a surface to provide user input than to provide user input at different positions on the flat surface. The extender objects as described herein may operate as an input to a system that facilitates collaboration through being physical, for example, an architectural model that drives a simulation. Modifying the placement and arrangement of blocks that represent buildings or architectural features change the parameters of the simulation and having the input provided by physical extender blocks may make it easier to understand and collaborate between people compared to an on-screen interface.

A first further example provides a multi-modal sensing surface comprising: two overlaid arrays, the two arrays comprising a capacitive sensing electrode array and an array of RF antennas; a first sensing module coupled to the capacitive sensing electrode array and arranged to detect both an increase and a decrease of capacitance between electrodes in the array; and a second sensing module coupled to the array of RF antennas and arranged to selectively tune and detune one or more of the RF antennas in the array of RF antennas.

In the first further example, the second sensing module may be further arranged to receive data transmitted by one or more wireless tags proximate to a tuned RF antenna and via that tuned RF antenna.

In the first further example, the second sensing module may be arranged to selectively tune one or more of the RF antennas in the array of RF antennas to a frequency corresponding to a wireless tag.

In the first further example, the second sensing module may be arranged to selectively detune one or more of the RF antennas in the array of RF antennas by deactivating the antenna.

In the first further example, the array of RF antennas may comprise a first set of RF antennas at a first orientation and a second set of RF antennas at a second orientation. The first set of RF antennas may be perpendicular to the second set of RF antennas and may lie in a plane parallel to a plane comprising the second set of RF antennas.

In the first further example, the sensing surface may comprise a touch surface and the array of RF antennas may be on an opposite side of the capacitive sensing array from the touch surface.

In the first further example, the second sensing module may be further arranged to connect the array of RF antennas to ground whilst the first sensing module is detecting capacitance changes between the electrodes in the capacitive sensing electrode array.

In the first further example, each RF antenna may have a pre-defined signal response and the antennas in the array of RF antennas may be spaced such that a null in the signal response of one RF antenna does not substantially align with a null in the signal response of an adjacent RF antenna.

In the first further example, the two overlaid arrays may be formed in or on a flexible substrate. At least one of the two overlaid arrays may be woven into a fabric substrate.

The first further example may further comprise a communication interface arranged to communicate data to a separate computing device, the data comprising locations of any touch events and objects detected by the first sensing module and identities of any objects determined by the second sensing module.

In the first further example, the first and second sensing modules may be located in a detachable electronics module and may be coupled to the arrays via one or more connectors.

A second further example provides a computing device comprising the multi-modal sensing surface according to the first further example.

A third further example provides a method of detecting and locating touch events and objects using a multi-modal sensing surface, the method comprising: detecting, in a first sensing module in the multi-modal sensing surface, changes in capacitance between electrodes in a capacitive sensing electrode array in the multi-modal sensing surface; in response to detecting, in the first sensing module, a decrease in capacitance between the electrodes at a first location, providing location data identifying the first location as an input to a computer program; in response to detecting, in the first sensing module, an increase in capacitance between the electrodes at a second location: identifying, based on the second location, an RF antenna in an array of RF antennas in the multi-modal sensing surface; detuning, in a second sensing module in the multi-modal sensing surface, one or more adjacent RF antennas in the array of RF antennas; and reading, by the second sensing module and via the identified RF antenna, data from any proximate wireless tags.

The method of the third further example may further comprise: prior to detecting changes in capacitance, connecting the array of RF antennas to ground.

The method of the third further example may further comprise: in response to detecting, in the first sensing module, an increase in capacitance between the electrodes at a second location: providing location data identifying the second location and any data read from any proximate wireless tags as an input to a computer program.

The method of the third further example may further comprise: in response to detecting, in the first sensing module, an increase in capacitance between the electrodes at a second location: tracking motion of an object initially at the second location on the multi-modal sensing surface. The motion may be tracked by repeatedly analyzing strengths of signals received by the identified RF antenna from any proximate wireless tags.

A fourth further example provides a user input device comprising a multi-modal sensing surface, the multi-modal sensing surface comprising a sensing mat and an electronics module and wherein the sensing mat comprises two overlaid arrays, the two arrays comprising a capacitive sensing electrode array and an array of RF antennas and the electronics module comprises a first sensing module coupled to the capacitive sensing electrode array and arranged to detect both an increase and a decrease of capacitance between electrodes in the array and a second sensing module coupled to the array of RF antennas and arranged to selectively tune and detune one or more of the RF antennas in the array of RF antennas.

In the fourth further example, the second sensing module may be further arranged to receive data transmitted by one or more wireless tags proximate to a tuned RF antenna and via that tuned RF antenna.

In the fourth further example, the second sensing module may be arranged to selectively tune one or more of the RF antennas in the array of RF antennas to a frequency corresponding to a wireless tag.

In the fourth further example, the second sensing module may be arranged to selectively detune one or more of the RF antennas in the array of RF antennas by deactivating the antenna.

In the fourth further example, the array of RF antennas may comprise a first set of RF antennas at a first orientation and a second set of RF antennas at a second orientation. The first set of RF antennas may be perpendicular to the second set of RF antennas and may lie in a plane parallel to a plane comprising the second set of RF antennas.

In the fourth further example, the sensing surface may comprise a touch surface and the array of RF antennas may be on an opposite side of the capacitive sensing array from the touch surface.

In the fourth further example, the second sensing module may be further arranged to connect the array of RF antennas to ground whilst the first sensing module is detecting capacitance changes between the electrodes in the capacitive sensing electrode array.

In the fourth further example, each RF antenna may have a pre-defined signal response and the antennas in the array of RF antennas may be spaced such that a null in the signal response of one RF antenna does not substantially align with a null in the signal response of an adjacent RF antenna.

In the fourth further example, the two overlaid arrays may be formed in or on a flexible substrate. At least one of the two overlaid arrays may be woven into a fabric substrate.

The fourth further example may further comprise a communication interface arranged to communicate data to a separate computing device, the data comprising locations of any touch events and objects detected by the first sensing module and identities of any objects determined by the second sensing module.

In the fourth further example, the first and second sensing modules may be located in a detachable electronics module and may be coupled to the arrays via one or more connectors.

In the first and/or fourth further example, the first and/or second sensing module may be at least partially implemented using hardware logic selected from any one or more of: a field-programmable gate array, a program-specific integrated circuit, a program-specific standard product, a system-on-a-chip, a complex programmable logic device.

A fifth further example provides an object comprising a first antenna coil and a second antenna coil, wherein the first and second antenna coils are electrically connected together and wherein at least one of the first and second antenna coils comprises a plurality of radial elements extending in and/or out from the coil.

Both the first and second antenna coils may comprise a plurality of radial elements extending in and/or out from the coil.

The first and second antenna coils may be spatially separated.

The first antenna coil may be on a first face of the object and the second antenna coil may be on a second face of the object.

The object may further comprise a third antenna coil and a fourth antenna coil, wherein the third and fourth antenna coils are electrically connected together and wherein at least one of the third and fourth antenna coils comprises a plurality of radial elements extending in and/or out from the coil. The third antenna coil may be on the first face of the object and the fourth antenna coil may be on the second face of the object.

The object may further comprise at least one additional antenna coil on the first face and wherein each additional antenna coil is electrically connected to the second antenna.

The object may further comprise a further antenna coil on a third face of the object and wherein the further antenna coil is electrically connected to one of the first and second antenna coils.

The object may further comprise an NFC IC.

A sixth further example provides a system comprising a multi-modal sensing surface and an extender object configured to extend sensing capabilities of the multi-modal sensing surface away from the surface, the extender object comprising a first antenna coil and a second antenna coil, wherein the first and second antenna coils are electrically connected together and wherein at least one of the first and second antenna coils comprises a plurality of radial elements extending in and/or out from the coil and the multi-modal sensing surface comprising: two overlaid arrays, the two arrays comprising a capacitive sensing electrode array and an array of RF antennas; a first sensing module coupled to the capacitive sensing electrode array and arranged to detect both an increase and a decrease of capacitance between electrodes in the array; and a second sensing module coupled to the array of RF antennas and arranged to selectively tune and detune one or more of the RF antennas in the array of RF antennas.

The second sensing module in the multi-modal sensing surface may be further arranged to receive data transmitted by one or more wireless tags proximate to a tuned RF antenna and via that tuned RF antenna.

The second sensing module in the multi-modal sensing surface may be arranged to selectively tune one or more of the RF antennas in the array of RF antennas to a frequency corresponding to a wireless tag.

The second sensing module in the multi-modal sensing surface may be arranged to selectively detune one or more of the RF antennas in the array of RF antennas by deactivating the antenna.

The array of RF antennas in the multi-modal sensing surface may comprise a first set of RF antennas at a first orientation and a second set of RF antennas at a second orientation.

The first set of RF antennas in the multi-modal sensing surface may be perpendicular to the second set of RF antennas in the multi-modal sensing surface and lie in a plane parallel to a plane comprising the second set of RF antennas.

The multi-modal sensing surface may comprise a touch surface and the array of RF antennas is on an opposite side of the capacitive sensing array from the touch surface.

The second sensing module in the multi-modal sensing surface may be further arranged to connect the array of RF antennas to ground whilst the first sensing module is detecting capacitance changes between the electrodes in the capacitive sensing electrode array.

Each RF antenna in the multi-modal sensing surface may have a pre-defined signal response and wherein the antennas in the array of RF antennas may be spaced such that a null in the signal response of one RF antenna does not substantially align with a null in the signal response of an adjacent RF antenna.

The two overlaid arrays in the multi-modal sensing surface may be formed in or on a flexible substrate.

The multi-modal sensing surface may further comprise a communication interface arranged to communicate data to a separate computing device, the data comprising locations of any touch events and objects detected by the first sensing module in the multi-modal sensing surface and identities of any objects determined by the second sensing module in the multi-modal sensing surface.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices such as disks, thumb drives, memory etc. and do not include propagated signals. Propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising:
   a multi-modal sensing surface comprising a short-range wireless tag; and
   an extender object configured to extend sensing capabilities of the multi-modal sensing surface away from the surface, the extender object comprising:
   a first antenna coil directly coupled to the short-range wireless tag; and
   a second antenna coil, wherein the first and second antenna coils are electrically connected together and wherein at least one of the first and second antenna coils comprises a first plurality of radial elements extending out from an outermost ring of the coil and a second plurality of radial elements extending in from an innermost ring of the coil, the multi-modal sensing surface comprising:

two overlaid arrays, the two arrays comprising a capacitive sensing electrode array and an array of RF antennas;
a first sensing module coupled to the capacitive sensing electrode array and arranged to detect both an increase and a decrease of capacitance between electrodes in the array; and
a second sensing module coupled to the array of RF antennas and arranged to selectively tune and detune one or more of the RF antennas in the array of RF antennas.

2. The system according to claim 1, wherein the second sensing module in the multi-modal sensing surface is further arranged to receive data transmitted by one or more wireless tags proximate to a tuned RF antenna and via the tuned RF antenna.

3. The system according to claim 2, wherein the second sensing module in the multi-modal sensing surface is arranged to selectively tune one or more of the RF antennas in the array of RF antennas to a frequency corresponding to a wireless tag.

4. The system according to claim 1, wherein the second sensing module in the multi-modal sensing surface is arranged to selectively detune one or more of the RF antennas in the array of RF antennas by deactivating the antenna.

5. The system according to claim 1, wherein the array of RF antennas in the multi-modal sensing surface comprises a first set of RF antennas at a first orientation and a second set of RF antennas at a second orientation.

6. The system according to claim 5, wherein the first set of RF antennas in the multi-modal sensing surface are perpendicular to the second set of RF antennas in the multi-modal sensing surface and lie in a plane parallel to a plane comprising the second set of RF antennas.

7. The system according to claim 1, wherein the short-range wireless tag is a near-field communication tag or a near-field radio frequency identification (RFID) tag.

8. The system according to claim 1, wherein the second sensing module in the multi-modal sensing surface is further arranged to connect the array of RF antennas to ground whilst the first sensing module is detecting capacitance changes between the electrodes in the capacitive sensing electrode array.

9. The system according to claim 1, each RF antenna in the multi-modal sensing surface having a pre-defined signal response and wherein the antennas in the array of RF antennas are spaced such that a null in the signal response of one RF antenna does not substantially align with a null in the signal response of an adjacent RF antenna.

10. The system according to claim 1, wherein the first antenna coil is on a first face of the extender object and the second antenna coil is on an opposing second face of the extender object.

11. The system according to claim 1, wherein the multi-modal sensing surface further comprises a communication interface arranged to communicate data to a separate computing device, the data comprising locations of any touch events and objects detected by the first sensing module in the multi-modal sensing surface and identities of any objects determined by the second sensing module in the multi-modal sensing surface.

12. An object comprising:
a multi-modal sensing surface comprising a short-range wireless tag; and
an extender object configured to extend sensing capabilities of the multi-modal sensing surface away from a surface, the extender object comprising:
a first antenna coil directly coupled to the short-range wireless tag; and
a second antenna coil, wherein the first and second antenna coils are electrically connected together and wherein at least one of the first and second antenna coils comprises a first plurality of radial elements extending in and out from an outermost ring of the coil and a second plurality of radial elements extending in from an innermost ring of the coil, the multi-modal sensing surface comprising:
two overlaid arrays, the two arrays comprising a capacitive sensing electrode array and an array of RF antennas;
a first sensing module coupled to the capacitive sensing electrode array and arranged to detect both an increase and a decrease of capacitance between electrodes in the array; and
a second sensing module coupled to the array of RF antennas and arranged to selectively tune and detune one or more of the RF antennas in the array of RF antennas.

13. The object according to claim 12, wherein the second sensing module in the multi-modal sensing surface is further arranged to receive data transmitted by one or more wireless tags proximate to a tuned RF antenna and via the tuned RF antenna.

14. The object according to claim 13, wherein the second sensing module in the multi-modal sensing surface is arranged to selectively tune one or more of the RF antennas in the array of RF antennas to a frequency corresponding to a wireless tag.

15. The object according to claim 12, wherein the second sensing module in the multi-modal sensing surface is arranged to selectively detune one or more of the RF antennas in the array of RF antennas by deactivating the antenna.

16. The object according to claim 12, wherein the array of RF antennas in the multi-modal sensing surface comprises a first set of RF antennas at a first orientation and a second set of RF antennas at a second orientation.

17. The object according to claim 16, wherein the first set of RF antennas in the multi-modal sensing surface are perpendicular to the second set of RF antennas in the multi-modal sensing surface and lie in a plane parallel to a plane comprising the second set of RF antennas.

18. The object according to claim 12, wherein the multi-modal sensing surface comprises a touch surface and the array of RF antennas is on an opposite side of the capacitive sensing array from the touch surface.

19. The object according to claim 12, wherein the second sensing module in the multi-modal sensing surface is further arranged to connect the array of RF antennas to ground whilst the first sensing module is detecting capacitance changes between the electrodes in the capacitive sensing electrode array.

20. The object according to claim 12, wherein the first plurality of radial elements and the second plurality of radial elements extent a touch area of the at least one of the first and second antenna coils.

* * * * *